(12) United States Patent
Boucadair et al.

(10) Patent No.: US 11,392,911 B2
(45) Date of Patent: Jul. 19, 2022

(54) METHOD FOR PROCESSING A TRANSACTION BETWEEN A SOURCE TERMINAL AND A DESTINATION TERMINAL, CORRESPONDING BANKING SERVICES SYSTEM, TERMINAL AND COMPUTER PROGRAM

(71) Applicant: Orange, Paris (FR)

(72) Inventors: Mohamed Boucadair, Chatillon (FR); Christian Jacquenet, Chatillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 17/044,240

(22) PCT Filed: Apr. 5, 2019

(86) PCT No.: PCT/FR2019/050804
§ 371 (c)(1),
(2) Date: Sep. 30, 2020

(87) PCT Pub. No.: WO2019/193296
PCT Pub. Date: Oct. 10, 2019

(65) Prior Publication Data
US 2021/0035076 A1    Feb. 4, 2021

(30) Foreign Application Priority Data

Apr. 6, 2018  (FR) ...................................... 1853045

(51) Int. Cl.
*G06Q 20/10* (2012.01)
*G06F 16/23* (2019.01)
(Continued)

(52) U.S. Cl.
CPC ....... *G06Q 20/108* (2013.01); *G06F 16/2379* (2019.01); *G06Q 20/325* (2013.01);
(Continued)

(58) Field of Classification Search
None
See application file for complete search history.

(56) References Cited

U.S. PATENT DOCUMENTS 5,095,480 A * 3/1992 Fenner .................. H04L 45/742
340/2.4
5,490,258 A * 2/1996 Fenner .................. H04L 45/742
707/999.001
(Continued)

OTHER PUBLICATIONS

G. Neonakis Aggelou and R. Tafazolli, "On the relaying capability of next-generation GSM cellular networks," in IEEE Personal Communications, vol. 8, No. 1, pp. 40-47, Feb. 2001 (GSM Cellular) (Year: 2001).*
(Continued)

*Primary Examiner* — Chikaodinaka Ojiaku
(74) *Attorney, Agent, or Firm* — Knobbe, Martens, Olson & Bear, LLP

(57) ABSTRACT

A method for processing a transaction between a source terminal and a destination terminal having a transaction phase is disclosed. In one aspect the method comprises receiving by a source BTS, connected to the source terminal a transaction request originating from the source terminal the request carrying at least one identifier of the destination terminal and a transaction amount. Then obtaining by the source BTS destination terminal location information on the basis of at least one location database, denoted BLDB and the destination terminal identifier. Then determining by the source BTS at least one destination BTS connected to the destination terminal on the basis of the destination terminal location information. Then transmitting to the destination terminal by the destination BTS the request or one item of information relating to the transaction.

10 Claims, 8 Drawing Sheets

(51) Int. Cl.
*G06Q 20/40* (2012.01)
*G06Q 40/02* (2012.01)
*G06Q 20/32* (2012.01)
*G06Q 30/00* (2012.01)
*H04W 88/02* (2009.01)

(52) U.S. Cl.
CPC ..... *G06Q 20/3223* (2013.01); *G06Q 20/3224* (2013.01); *G06Q 20/4015* (2020.05); *G06Q 40/02* (2013.01); *G06Q 30/0185* (2013.01); *H04W 88/02* (2013.01)

(56) References Cited

U.S. PATENT DOCUMENTS

| | | | | |
|---|---|---|---|---|
| 5,842,224 A * | 11/1998 | Fenner | H04L 29/06 | 711/201 |
| 5,860,136 A * | 1/1999 | Fenner | H04W 40/02 | 711/201 |
| 6,084,704 A * | 7/2000 | Button | H04B 10/2972 | 398/1 |
| 7,392,940 B2 * | 7/2008 | Hansen | G06Q 20/10 | 235/379 |
| 7,957,266 B2 * | 6/2011 | Kodialam | H04L 45/04 | 370/216 |
| 8,938,398 B2 * | 1/2015 | McNelley | G06Q 20/401 | 705/44 |
| 9,288,628 B2 * | 3/2016 | Anderson | H04W 64/00 | |
| 9,584,343 B2 * | 2/2017 | Brezina | G06F 16/9535 | |
| 10,200,277 B2 * | 2/2019 | Sreeramoju | H04L 69/14 | |
| 10,742,541 B2 * | 8/2020 | Kim | H04W 76/16 | |
| 10,911,600 B1 | 2/2021 | Frenkel | G10L 17/00 | |
| 2002/0164004 A1 * | 11/2002 | Tamura | H04N 21/4725 | 379/93.12 |
| 2003/0217094 A1 * | 11/2003 | Andrews | G06Q 10/10 | 709/201 |
| 2004/0029601 A1 * | 2/2004 | O'Neill | H04L 45/22 | 455/500 |
| 2004/0122720 A1 * | 6/2004 | Mikalsen | G06Q 30/02 | 709/203 |
| 2004/0133441 A1 * | 7/2004 | Brady | G06Q 10/08 | 709/201 |
| 2004/0139009 A1 * | 7/2004 | Kozee | G06Q 20/102 | 705/40 |
| 2004/0139010 A1 * | 7/2004 | McMichael | G06Q 20/102 | 705/40 |
| 2004/0139011 A1 * | 7/2004 | Kozee | G06Q 30/04 | 705/40 |
| 2004/0156495 A1 * | 8/2004 | Chava | H04L 45/00 | 379/392 |
| 2004/0167834 A1 * | 8/2004 | Koskinen | H04M 15/06 | 705/30 |
| 2005/0086297 A1 * | 4/2005 | Hinks | H04L 67/02 | 709/217 |
| 2005/0094576 A1 | 5/2005 | Fonseca et al. | | |
| 2005/0117535 A1 * | 6/2005 | Mahonen | H04W 40/02 | 370/328 |
| 2005/0138553 A1 * | 6/2005 | Ballard | G06Q 10/10 | 715/237 |
| 2005/0138648 A1 * | 6/2005 | Ahmed | G06Q 30/08 | 719/315 |
| 2006/0003775 A1 * | 1/2006 | Bull | H04W 4/025 | 455/456.1 |
| 2006/0030333 A1 * | 2/2006 | Ward | H04W 60/04 | 455/456.1 |
| 2006/0253294 A1 * | 11/2006 | Martti | G06Q 30/02 | 455/406 |
| 2006/0256729 A1 * | 11/2006 | Chen | H04L 63/1408 | 370/250 |
| 2007/0007329 A1 * | 1/2007 | Grovit | G06Q 40/00 | 235/379 |
| 2007/0007330 A1 * | 1/2007 | Grovit | G06Q 20/10 | 235/379 |
| 2007/0055672 A1 * | 3/2007 | Stevens | H04L 67/18 | |
| 2007/0055785 A1 * | 3/2007 | Stevens | G06Q 20/405 | 709/229 |
| 2007/0060367 A1 * | 3/2007 | Heler | G06F 11/3466 | 463/42 |
| 2007/0094142 A1 * | 4/2007 | Russell | G06Q 30/06 | 705/52 |
| 2007/0106904 A1 * | 5/2007 | Christoff | H04L 9/3226 | 713/183 |
| 2007/0156758 A1 * | 7/2007 | Adiga | G06Q 50/16 | |
| 2007/0198433 A1 * | 8/2007 | McGee | G06Q 20/342 | 705/65 |
| 2007/0206515 A1 * | 9/2007 | Andreasen | H04L 47/724 | 370/255 |
| 2007/0220604 A1 * | 9/2007 | Long | G06F 21/55 | 726/22 |
| 2008/0025208 A1 * | 1/2008 | Chan | H04L 12/42 | 370/258 |
| 2008/0040717 A1 * | 2/2008 | Hobson | G06Q 10/00 | 718/101 |
| 2008/0104674 A1 * | 5/2008 | Sherkin | H04L 51/12 | 726/4 |
| 2008/0120196 A1 * | 5/2008 | Reed | G06Q 30/0278 | 705/17 |
| 2008/0120400 A1 * | 5/2008 | Keller | G06Q 10/06 | 709/223 |
| 2008/0120617 A1 * | 5/2008 | Keller | G06Q 10/063 | 718/101 |
| 2008/0215427 A1 * | 9/2008 | Kawada | G06Q 30/0267 | 705/14.51 |
| 2008/0281621 A1 * | 11/2008 | Shan | H04L 51/04 | 709/206 |
| 2008/0294551 A1 * | 11/2008 | Degenhart | G06Q 20/10 | 705/39 |
| 2009/0055298 A1 * | 2/2009 | Foil | G06Q 30/04 | 705/34 |
| 2009/0089128 A1 * | 4/2009 | Tkatch | G06Q 10/06 | 707/999.102 |
| 2009/0138895 A1 * | 5/2009 | Dumas | G06Q 10/06 | 719/315 |
| 2009/0169019 A1 * | 7/2009 | Bauchot | H04L 9/3247 | 380/278 |
| 2009/0252134 A1 * | 10/2009 | Schlicht | H04L 1/0015 | 709/205 |
| 2009/0276269 A1 * | 11/2009 | Yee | G06F 8/70 | 705/317 |
| 2010/0057560 A1 * | 3/2010 | Skudlark | H04N 21/812 | 705/14.49 |
| 2010/0217710 A1 * | 8/2010 | Fujita | G06Q 20/38215 | 705/71 |
| 2010/0227628 A1 * | 9/2010 | Anderson | H04W 4/029 | 455/456.3 |
| 2010/0287541 A1 * | 11/2010 | Saunders | G06F 11/3466 | 717/139 |
| 2011/0188387 A1 * | 8/2011 | Das | H04L 43/00 | 370/252 |
| 2011/0196787 A1 * | 8/2011 | Alroy | G06Q 20/065 | 705/41 |
| 2011/0276476 A1 * | 11/2011 | Kim | G06Q 20/26 | 705/39 |
| 2012/0101950 A1 * | 4/2012 | Dharmapalan | G06Q 20/3674 | 705/67 |
| 2012/0209762 A1 * | 8/2012 | Metaireau | G06Q 20/3223 | 705/39 |
| 2013/0006872 A1 * | 1/2013 | Chandoor | G06Q 20/3223 | 705/75 |
| 2013/0046687 A1 * | 2/2013 | Simpson, Jr. | G06Q 40/02 | 705/40 |
| 2013/0060681 A1 * | 3/2013 | Nezu | G06Q 40/02 | 705/39 |
| 2013/0290187 A1 * | 10/2013 | Itwaru | G06Q 20/20 | 705/44 |
| 2013/0310070 A1 * | 11/2013 | Anderson | H04W 64/003 | 455/456.1 |
| 2014/0006048 A1 * | 1/2014 | Liberty | G16H 10/60 | 705/2 |

(56) References Cited

U.S. PATENT DOCUMENTS

| | | | |
|---|---|---|---|
| 2014/0244500 A1* | 8/2014 | Elias | G06Q 20/065 |
| | | | 705/43 |
| 2014/0344161 A1* | 11/2014 | Sato | G06Q 20/3223 |
| | | | 705/67 |
| 2015/0229512 A1* | 8/2015 | Dutti | H04L 41/0816 |
| | | | 709/221 |
| 2016/0070964 A1* | 3/2016 | Conrad | H04N 5/232 |
| | | | 348/150 |
| 2016/0086261 A1* | 3/2016 | Shah | G06Q 10/105 |
| | | | 705/38 |
| 2016/0104132 A1* | 4/2016 | Abbatiello | G06Q 20/386 |
| | | | 705/39 |
| 2016/0104133 A1* | 4/2016 | Davis | G06Q 50/01 |
| | | | 705/39 |
| 2016/0104159 A1* | 4/2016 | Butterfield | G06Q 20/384 |
| | | | 705/44 |
| 2016/0294612 A1* | 10/2016 | Ravinoothala | H04L 45/42 |
| 2016/0371660 A1* | 12/2016 | Webb | G06Q 20/4016 |
| 2016/0371661 A1* | 12/2016 | Shah | G06Q 20/401 |
| 2017/0140380 A1* | 5/2017 | Tan | G06Q 40/02 |
| 2017/0163532 A1* | 6/2017 | Tubaltsev | H04L 49/354 |
| 2018/0025331 A1* | 1/2018 | Dallenbach | G06Q 20/36 |
| | | | 705/39 |
| 2018/0144346 A1* | 5/2018 | Yu | G06Q 20/3223 |
| 2018/0351852 A1* | 12/2018 | Boucadair | H04L 61/2007 |
| 2019/0208040 A1* | 7/2019 | Boucadair | H04L 63/083 |
| 2019/0268797 A1* | 8/2019 | Pang | H04L 47/125 |
| 2019/0273809 A1* | 9/2019 | Boucadair | H04L 63/0853 |
| 2019/0295160 A1* | 9/2019 | Shiokawa | G06Q 30/02 |
| 2019/0303889 A1* | 10/2019 | Cho | H04L 65/403 |
| 2019/0354982 A1* | 11/2019 | Gomez | G06Q 20/405 |
| 2020/0013038 A1* | 1/2020 | Kurata | G06Q 20/2295 |
| 2020/0120015 A1* | 4/2020 | Boucadair | H04L 65/1033 |
| 2020/0145324 A1* | 5/2020 | Wei | H04L 12/66 |

OTHER PUBLICATIONS

Tsai, Jack W. and Tim Moors. "A Review of Multipath Routing Protocols : From Wireless Ad Hoc to Mesh Networks." (2006). (Multipath) (Year: 2006).*

"Digital cellular telecommunications system; Location registration procedures (GSM 03.12)", Global system for mobile technical specification, Source: ETSI TC-SMG, Version 5.0.0, Nov. 1, 1996.

International Search Report dated Jun. 14, 2019, issued in Patent Cooperation Treaty Application No. PCT/FR2019/050804.

\* cited by examiner

METHOD FOR PROCESSING A TRANSACTION BETWEEN A SOURCE TERMINAL AND A DESTINATION TERMINAL, CORRESPONDING BANKING SERVICES SYSTEM, TERMINAL AND COMPUTER PROGRAM

CROSS-REFERENCE TO RELATED APPLICATIONS

This application is filed under 35 U.S.C. § 371 as the U.S. National Phase of Application No. PCT/FR2019/050804 entitled "METHOD FOR PROCESSING A TRANSACTION BETWEEN A SOURCE TERMINAL AND A DESTINATION TERMINAL, CORRESPONDING BANKING SERVICES SYSTEM, TERMINAL AND COMPUTER PROGRAM" and filed Apr. 5, 2019, and which claims priority to FR 1853045 filed Apr. 6, 2018, each of which is incorporated by reference in its entirety.

BACKGROUND

Technical Field

The field of the invention is that of communications within a communication network, for example an IP network.

More specifically, the invention offers a solution for implementing transactions, particularly financial ones, between communication terminals (mobile phone, tablet, computer, etc.).

The invention finds applications particularly, but not exclusively, in the field of money transfer between users of terminals connected to the Internet.

Description of the Related Technology

The IP network is the universal medium for a multitude of services and applications. Some telecommunications operators use this IP network notably to support their various service offerings, for example their banking services offerings.

The operators offer an e-wallet service that allows their customers to conduct transactions (bank transfer, cash withdrawal at partner stores, credit to the recipient's e-wallet, telephone credit recharging, etc.) from their terminal to other customers who have subscribed to the service, and who are located, for example, in France, in Mali, in Côte d'Ivoire, in Senegal or in Guinea.

A disadvantage of such a technique is that it requires the issuer and the recipient to have a specific account and to be customers of the same operator offering such a banking transaction service.

Another disadvantage is that the service offering is limited to a few countries (for example, France, Mali, Côte d'Ivoire, Senegal or Guinea).

Another disadvantage is that bank charges can be high.

There is therefore a need for a new low-cost financial transaction technique between terminals, that is notably accessible regardless of the operators and the location of these terminals.

SUMMARY OF CERTAIN INVENTIVE ASPECTS

The invention proposes a new solution for processing a transaction between a source terminal and a destination terminal, implementing a transaction phase comprising:

receiving, by a banking services system, referred to as source BTS ("Banking Transfer System"), connected to the source terminal, a transaction request originating from the source terminal, said request including at least one identifier of the destination terminal and a transaction amount, obtaining, by the source BTS, destination terminal location information, on the basis of at least one location database, denoted BLDB ("BTS Location Data Base"), and the destination terminal identifier, determining, by the source BTS, at least one banking services system, referred to as destination BTS, connected to the destination terminal, on the basis of the destination terminal location information, if the source BTS is not the destination BTS, at least one iteration of the following steps, implemented as long as the transaction request has not reached the destination BTS:

selecting an intermediate banking services system, referred to as intermediate BTS, taking into account at least one selection criterion, transmitting to the intermediate BTS the transaction request;

transmitting to the destination terminal, by the destination BTS, the request or one item of information relating to the request (such as the success or failure of the transaction).

The invention thus proposes a new solution for processing a transaction, for example a banking transaction, based on the use of at least one banking services system, to which the source terminal is connected, and at least one location database for locating the destination terminal.

In particular, if the source BTS differs from the destination BTS (i.e. the source and destination terminals are not connected to the same BTS), the invention proposes to network several BTSs (that can belong to different operators, be located in different regions, implement different technologies, etc.) and, if several paths are possible between the source BTS and the destination BTS, to select the path meeting at least one selection criterion (for example a minimum number of intermediate BTSs, a minimum transfer cost, a minimum distance between the BTSs, a balancing of the number or amount of the transactions between different operators, etc.).

Thus, according to a particular embodiment, following a money transfer request for example, the networked BTSs can engage in a global negotiation to obtain the transfer path that will result in the lowest transfer commission.

In particular, one embodiment of the invention proposes an innovative solution allowing the telecommunications operators to diversify their offerings, particularly in the banking sector, by offering their customers the possibility of executing financial transactions whatever their means of access to the network (fixed or mobile), whatever their means of communication (e.g. text message, IP packets), and respecting constraints in terms of security, confidentiality, speed of execution and robustness of the transactional exchanges.

According to an embodiment of the invention, the pooling of the resources and/or the procedures for verifying the identity of a user, as well as the contribution of the "all-IP", make it possible to reduce transfer costs, while freeing oneself from technical constraints such as those observed for currently practised money transfer methods (e.g. the client receiving the transaction travelling to an agency where they can collect the money transferred, providing passwords, etc.).

According to at least one embodiment, the invention proposes an improvement of the banking transaction services by allowing the various players to benefit from a communication infrastructure capable of supporting transactional exchanges in order to deliver an attractive value-added service: transactions executed almost immediately and compatible with the roaming of the recipients, reduced transfer charges, etc.

According to at least one embodiment, the proposed solution can resolve at least one disadvantage of the techniques of the prior art, and presents at least one of the advantages below:

the proposed solution does not impose any technical constraints:
the means of communication used between the source terminal and the source BTS can be the mobile network, an IP connectivity service, the PSTN ("Public Switched Telephone Network") network, a Facebook® account, etc.;
the source BTS and the destination BTS can be distinct, and managed by distinct operators;
the means of communication used between the source terminal and the source BTS can be different from that used between the destination BTS and the destination terminal; for example, the issuer of the transaction can use their fixed Internet connection to initiate the transaction, while the recipient of the transaction is identified with a mobile number or a Facebook® account;
the proposed solution does not impose any geographical constraints: the transactions are not limited to a single operator, a single country, or a group of countries. The global connectivity enables the deployment of a service for processing a transaction, such as a transfer of money, on a large scale and immediately, while capitalising on the existing IP infrastructures, the value-added mobile services, etc.
the proposed solution can automatically discover the existing BTSs, to establish interconnection agreements automatically, to exchange the transaction placement data, to place the transactions, etc.;
the proposed solution is dynamic: for example, if the recipient is roaming, an amount of money transferred can be available in the recipient's new coverage area (denoted for example "Visited") and not only in their home area (denoted for example "Home");
the proposed solution is reliable: the BTS can dynamically choose the appropriate paths for a better reliability of the transactions;
a maximum transfer cost can be defined for a BTS, and the actual charges can be negotiated downwards at the time of the execution of the transaction. The transfer charges are therefore not necessarily fixed;
the issuer of the transaction does not need to contact the recipient to provide a password that the latter would have to present in order to collect the amount transferred;
etc.

At least one embodiment of the invention also concerns a banking services system, referred to as BTS, for processing a transaction between a source terminal and a destination terminal, comprising at least one programmable computing machine or one dedicated computing machine configured to:
receive and/or transmit a transaction request, said request carrying at least one identifier of the destination terminal and a transaction amount,
obtain destination terminal location information, on the basis of at least one location database, denoted BLDB, and the destination terminal identifier,
determine at least one banking services system, referred to as destination BTS, connected to the destination terminal, on the basis of the destination terminal location information,
select at least one intermediate banking services system, referred to as intermediate BTS, taking into account at least one selection criterion.

In particular, such a BTS can be a source BTS, an intermediate BTS, or a destination BTS. A BTS can implement a service known as "brokering" ("broker" BTS) to select an intermediate BTS taking into account at least one selection criterion.

In the case of a source BTS, connected to the source terminal, the source BTS can receive the transaction request originating from the source terminal. If the source BTS is the destination BTS, i.e. if it is also connected to the destination terminal, it can transmit the request to the destination terminal. If the source BTS is not the destination BTS, it can transmit the request to the destination BTS, possibly via an intermediate BTS.

In the case of a destination BTS, connected to the destination terminal, the destination BTS can receive the transaction request originating from the source BTS or from an intermediate terminal. It can forward the transaction request to the destination terminal.

In the case of an intermediate BTS, the latter can receive the transaction request originating from the source BTS or from another intermediate BTS. It can transmit the transaction request to another intermediate BTS or to the destination BTS.

For example, such a BTS (source, destination or intermediate) comprises:
at least one execution entity (BTA, for "BTS Transfer Agent") capable of implementing at least one step belonging to the group comprising:
receiving and/or transmitting the transaction request,
obtaining destination terminal location information,
determining the destination BTS,
selecting at least one intermediate BTS.
at least one location database, or access means to at least one external location database,
at least one interconnection entity (BIE, for "BTS Interconnect Element") allowing the interconnection of the BTSs.

The invention also relates to a terminal, source or destination, used to process a transaction. For example, such a terminal comprises at least one programmable computing machine or one dedicated computing machine configured to issue a transaction request, said request including at least one identifier of the destination terminal and a transaction amount.

In another embodiment, the invention relates to one or more computer programs comprising instructions for implementing the method for processing a transaction according to at least one embodiment of the invention, when this or these programs is/are executed by a processor.

In yet another embodiment, the invention relates to one or more information medium, irremovable, or partially or totally removable, computer-readable, and comprising instructions from one or more computer programs for executing the steps of the method for processing a transaction according to at least one embodiment of the invention.

The methods according to the invention can therefore be implemented in various ways, notably in wired form and/or in software form.

BRIEF DESCRIPTION OF THE DRAWINGS

Other characteristics and advantages of the invention will emerge more clearly upon reading the following description of a particular embodiment, provided as a simple illustrative non-restrictive example, and the annexed drawings, wherein.

DETAILED DESCRIPTION OF CERTAIN ILLUSTRATIVE EMBODIMENTS

General Principle

The general principle of the invention is based on the use of at least one new system, referred to as banking services system or BTS ("Banking Transfer System"), and the networking of such systems, to route a transaction request from an issuer to a recipient.

Figure 1:
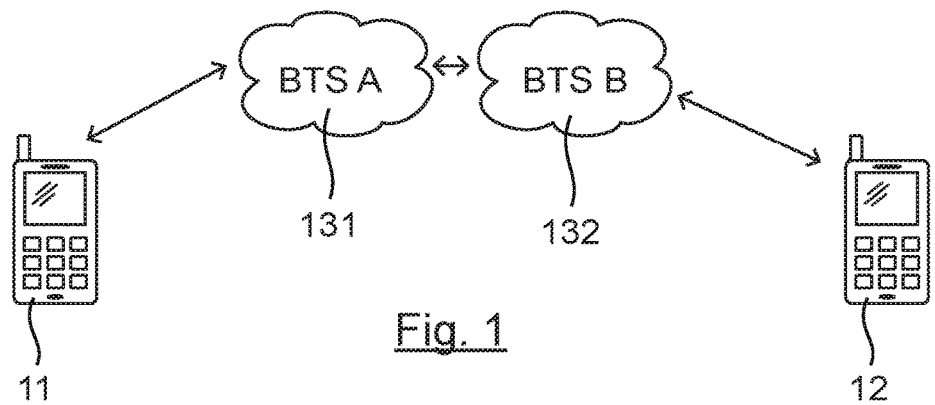
FIG. 1 illustrates an example of BTS networking to route a transaction request from a source terminal to a destination terminal.

For example, as illustrated in FIG. 1, one or more BTSs 131, 132 can be used to route a transaction request issued by a source terminal 11 to a destination terminal 12, in at least one IP communication network for example.

An IP communication network, or a set of IP networks that form an autonomous system AS, can host one or more BTSs. A BTS can also be connected to several ASs. A BTS can be operated by a banking operator. This banking operator can also act as a mobile services operator (i.e. a PLMN ("Public Land Mobile Network") operator), as a connectivity service operator, etc.

A BTS, according to at least one embodiment of the invention, is therefore a system used to provide banking services, such as the transfer of monetary funds.

The source terminal 11, associated with the issuer, and the destination terminal 12, associated with the recipient, can be registered with different BTSs. For example, the source terminal 11 is connected to the BTS A 131, referred to as source BTS, and the destination terminal is connected to the BTS B 132, referred to as destination BTS. The transactions are therefore not necessarily intra-operator, but can be inter-operator, for example when the issuer is a customer of a first operator (for example, Orange®) while the recipient is a customer of a second operator (for example, British Telecom®).

Figure 2A:
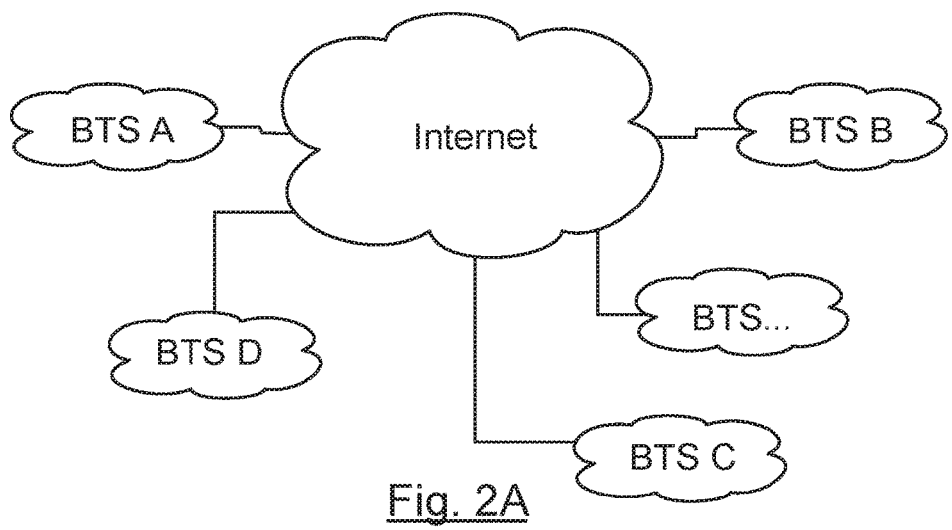
FIGS. 2A and 2B illustrate examples of connection between banking services systems (BTSs)
Figure 2B:
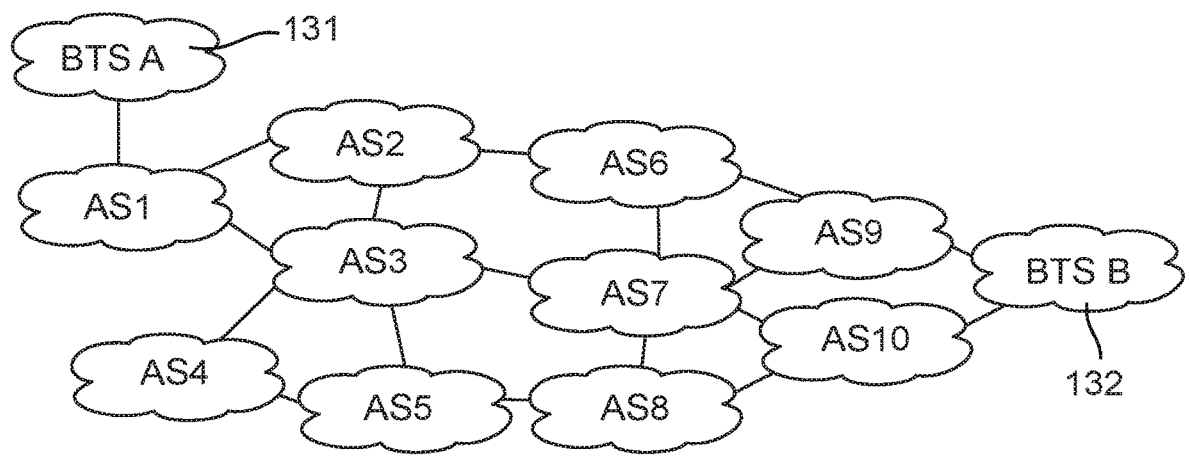

As illustrated in FIGS. 2A and 2B, the different BTSs can be connected via the Internet network, or via one or more ASs. A BTS (for example, the BTS B 132) can notably be multi-connected, to ensure a better availability of the Internet connectivity.

Each BTS can be identified with a globally unique code, called BTS identifier or BTID. This code can be used to identify a BTS in a univocal manner on a global scale. The BTID identifier can, for example, use a BIC ("Bank Identifier Code") code or SWIFT ("Society for Worldwide Interbank Financial Telecommunication") code, i.e. the international identification number of the banking operator operating the BTS. Such a BTID identifier can be used, in particular, to discover the existing BTS domains or to route a transaction request.

Figure 3:
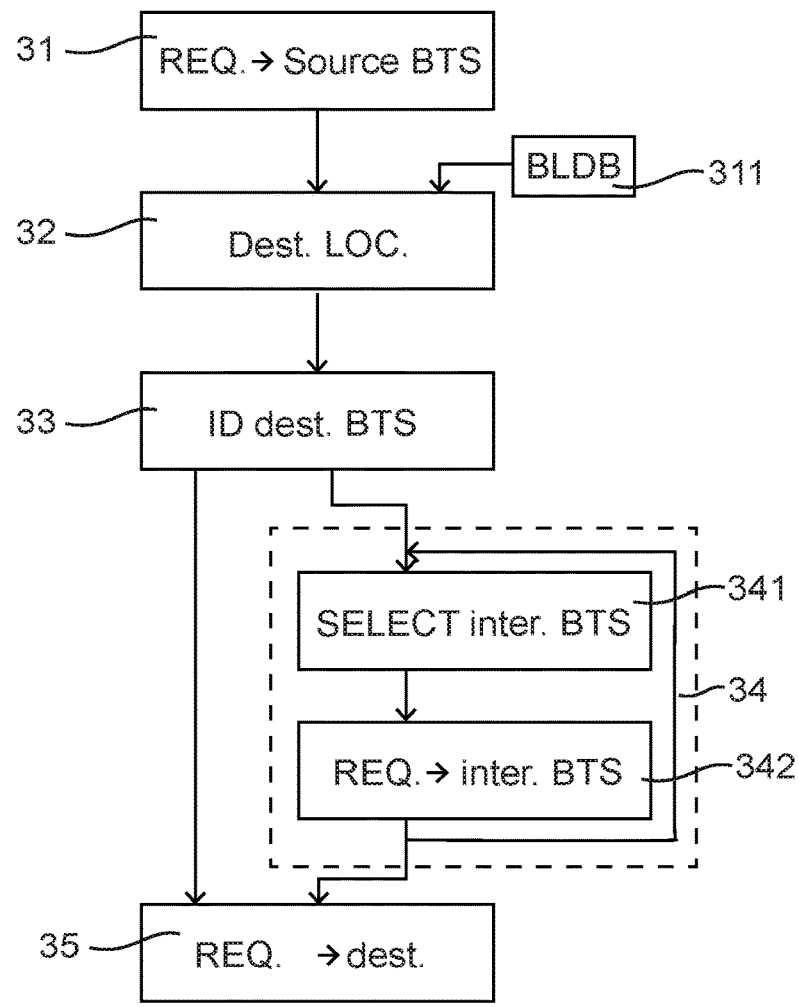
FIG. 3 shows the main steps of the method for processing a transaction according to a particular embodiment of the invention.

A description is given below, in relation to FIG. 3, of the main steps of a method for processing a transaction between a source terminal and a destination terminal, according to at least one embodiment of the invention, implemented during a transaction phase.

Taking the example in FIG. 1, the source BTS 131 receives (31) a transaction request, for example in a "TRANSFER" type message, originating from the source terminal 11. Such a request carries at least one identifier of the destination terminal 12 and a transaction amount.

According to at least one embodiment of the invention, the transaction request includes, in addition to the destination terminal identifier and the amount of the transaction, at least one item information belonging to the group comprising:
- a currency or a unit used for the transaction,
- an execution date for the transaction,
- an indicator indicating if the source terminal wants to be informed of the transaction status.

Based on the identifier of the destination terminal 12 and at least one location database 311, denoted BLDB, internal to the source BTS or accessible to the source BTS, the source BTS obtains (32) location information of the destination terminal 12.

The source BTS uses this location information of the destination terminal 12 to determine (33) the destination BTS 132, in particular the BTID identifier of the destination BTS 132.

If the source BTS is the destination BTS (i.e. if the source 11 and destination 12 terminals are connected to the same BTS), the BTS transmits (35) the transaction request to the destination terminal, or one item of information relating to the transaction (such as a success or failure). Note that additional information can be added to the transaction request before it is sent to the destination terminal.

If the source BTS is not the destination BTS (i.e. if the BTID identifier of the source BTS and the BTID identifier of the destination BTS are different), the method for processing a transaction implements at least one iteration 34 of the steps below, as long as the transaction request has not been received by the destination BTS:
- selecting 341 an intermediate banking services system, referred to as intermediate BTS, taking into account at least one selection criterion. For example, the selection criterion belongs to the group comprising:
  - a minimum transfer cost (for example, minimum exchange rate and/or commission charges);

a minimum number of intermediate BTSs;

a minimum distance between two BTSs;

a balancing of the number or amount of the transactions between different operators;

etc.

transmitting 342 the transaction request to the intermediate BTS. It is noted that additional information, such as the BTID identifier of the BTS transmitting the request and/or receiving the request, can be added to the transaction request before it is sent to the intermediate BTS.

The criterion for stopping the iterations is, in particular, the receipt, by the destination BTS, of the transaction request. The last "intermediate" BTS selected is therefore, in this case, the destination BTS.

Once a destination BTS has received the transaction request, the latter can transmit it (35) to the destination terminal, possibly accompanied by additional information. The destination BTS can transmit to the destination terminal, in addition to or instead of the transaction request, one item of information relating to the transaction, such as a failure or a success.

The destination terminal 12 can then confirm to the source terminal 11 that the request has been successfully received, using the same transmission path via the BTSs, or not.

Description of a Particular Embodiment

Definitions

A description is given below, in relation to FIG. 4, of a particular embodiment of the invention, according to which a BTS 41, identified for example by the identifier BTID #1, is composed of several physical and/or functional entities, comprising in particular.

at least one interconnection entity 411, or IE ("BTS Interconnect Element"), responsible for connecting one BTS to at least one other BTS. Several BIE interconnection entities can be active within the same BTS. Likewise, several BTSs can pool the same BIE interconnection entity;

a location database 412, or BLDB ("BTS Location Data Base"), storing the location information of the terminals locally connected to the BTS or connected to a remote BTS. For example, the BLDB comprises:

a local database 4121, or LLDB ("BTS Local Data Base"), comprising location information relating to at least one terminal connected to the local BTS, identified by an identifier. In other words, this LLDB is responsible for maintaining the location information (for example, addresses of contacts) that can reach the recipients locally connected to the BTS. In particular, the LLDB can contain E.164 addresses, MSISDN ("Mobile Station ISDN Number") numbers, SIP URIs ("Session Initiation Protocol Uniform Resource Identifier"), IP addresses, etc.

According to a first example, a BTS operator that is also a telecommunications operator can use its MSISDN database as an LLDB database to identify the customers who can locally be the recipients of a transaction.

In a second example, a BTS operator can set up a specific registration procedure that feeds the LLDB.

an interconnection database 4122, or BIDB ("BTS Interconnect Data Base"), comprising location information relating to at least one terminal connected to at least one remote BTS. In other words, this BIDB is responsible for maintaining the location information (for example, addresses of contacts) that allow to reach the recipients who are not connected to the local BTS, but to remote BTSs.

For example, the location information relating to at least one terminal connected to at least one remote BTS comprises:

a BTID identifier of the remote BTS, location information (for example, a contact address) of at least one BIE interconnection entity (of the remote BTS) being able to connect the local BTS to the remote BTS ("BIE Peer"), etc.

It is noted that a BIE interconnection entity can be co-located with the BLDB location database. The access to the BE uses for example the same contact address as the access to the BLDB.

The BLDB location database can also be instantiated on several BIEs. In this case, a synchronisation using dedicated mechanisms can be implemented.

Figure 5:
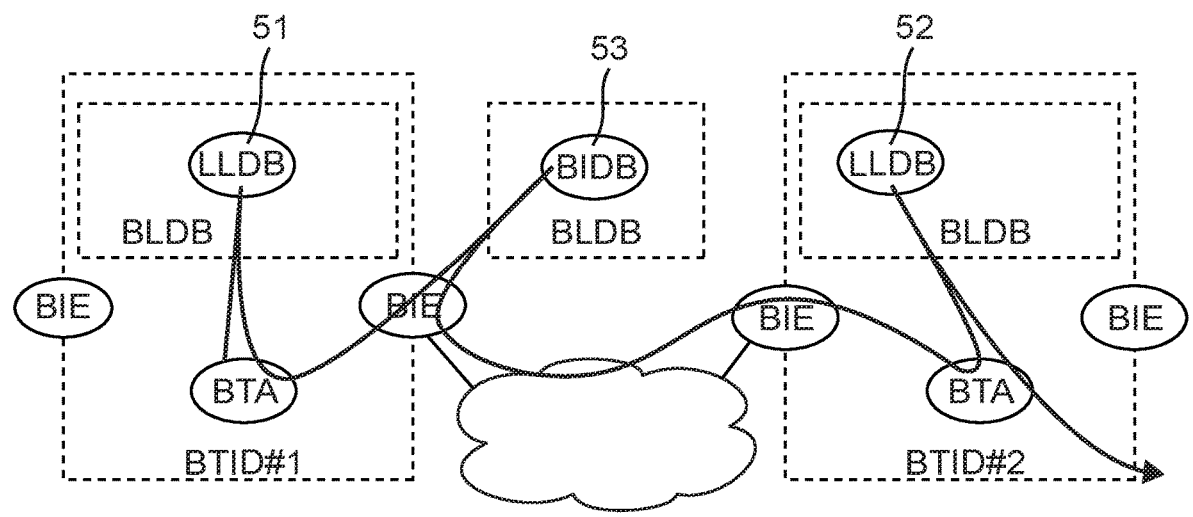
FIG. 5 illustrates an example of pooling for a location database.

In addition, the BLDB location database can be stored locally in a BTS, or outsourced and accessible to the BTS. For example, as illustrated in FIG. 5, the local database can be local to a BTS (LLDB 51 local to the BTS carrying the identifier BTID #1, LLDB 52 local to the BTS carrying the identifier BTID #2), and the BIDB interconnection database can be either local to a BTS, or pooled between several BTSs (BIDB 53 pooled between the BTSs BTID #1 and BTID #2), for example when the BTS operators managing these BTSs are members of a banking alliance that is in charge, among other things, of hosting the BIDB interconnection database.

at least one execution entity 413, or BTA ("BTS Transfer Agent"), responsible for executing the transaction requests. It ensures in particular the routing of a transaction request to a BIE in order to allow the BTS connected to the recipient of the transaction to complete the operation.

One or more BTA entities can be activated within a BTS.

In order to route a transaction request, a BTA entity solicits the BLDB location database.

Each BTA entity has the necessary information to contact either globally the BLDB location database ("generic" invocation) or directly the LLDB local database or the BIDB interconnection database ("specific" invocation). A BTA entity can also implement at least one operation belonging to the group comprising:

check that a maximum transfer amount is not reached, check the compliance of the file of the issuer of the transaction request (e.g. solvency elements, limit assigned to the issuer) with the legislation in force, check the availability of the funds to be transferred, etc.

Figure 4:
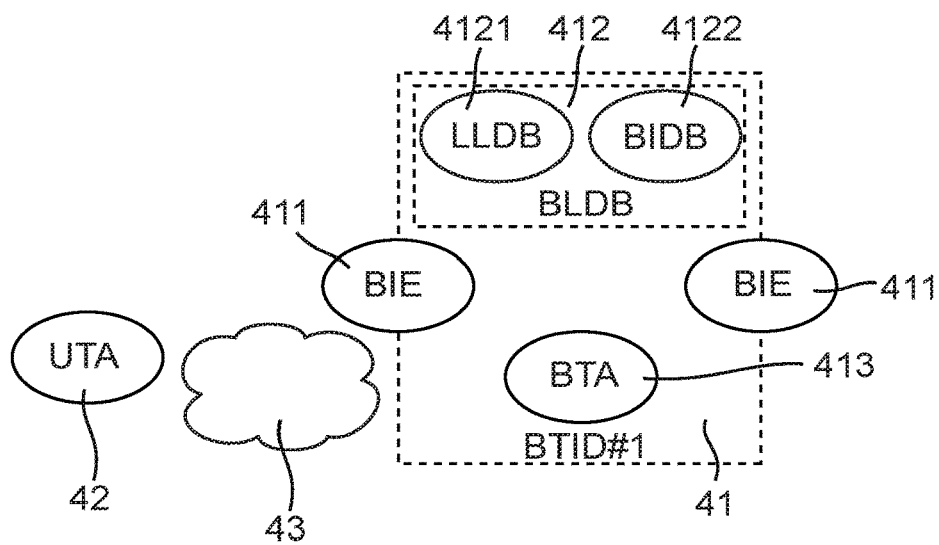
FIG. 4 illustrates an example of entities composing a BTS.

As illustrated in FIG. 4, a terminal 42 can be connected to one or more BTSs 41. The transport network 43 between the terminal 42 and the BTS 41 can be based on different technologies (PSTN, PLMN, IP, SIP, etc.). No constraints are imposed on the nature of the transport used to route a transfer request issued by a terminal to a BTS, in particular to the BTA entity of the BTS.

A terminal according to the invention is, for example, a mobile terminal, a terminal embedding a specific software instance, an SIP terminal, a telephone terminal, a personal computer, etc. In particular, such a terminal is equipped with a function authorising transaction processing, or UTA ("User Transfer Agent"). A terminal can be a dedicated application (typically a mobile application), a service accessible via a generic client (typically an e-mail client or a customer portal) embedded in another software client (for example, a WebRTC client embedded in a Web browser), etc. Such a dedicated application or software client can be accessible from one or more physical terminals. Hereafter, any terminal equipped with such a function allowing the processing of transactions according to the invention is referred to as a "UTA terminal", or more simply a terminal.

A UTA terminal can be identified with a globally unique code, called UTA identifier or UTA_ID. This UTA identifier is for example an MSISDN number, an SIP URI, an e-mail address, etc.

Also, a UTA terminal can be located, and therefore contacted, from the location information. The location information of a UTA terminal is called UTA locator or UTA_LOC. A UTA locator is for example an MSISDN number, an SIP URI, a PSTN number, an IP address, etc.

The UTA identifier and its UTA locator can be identical or different.

The same UTA terminal can be associated with several identifiers. Consequently, the same UTA locator can be used to locate several UTA identifiers.

The same UTA identifier can be reached with one or more UTA locators.

The identity of the BTS to be solicited for the transactions, or more specifically the identity of the BTA entity of the BTS to be solicited, can be configured dynamically on a UTA terminal (for example, using the IE ("Information Element") of the PCO ("Protocol Configuration Options") protocol, the DHCP ("Dynamic Host Configuration Protocol") or using a dedicated domain name (for example, "bta.bts.orange")).

A UTA terminal can be connected to one or more BTSs. In this case, the UTA identifier of this terminal is present in the location databases BLDB associated with these different BTSs.

Prior to the processing of transactions, a UTA terminal and a BTS (or more specifically a BTA entity of the BTS) can authenticate each other. The mutual authentication can for example use the EAP ("Extensible Authentication Protocol") protocol and more specifically EAP-TTLS ("EAP Tunneled Transport Layer Security").

The authentication, by the BTA entity of the BTS, of a UTA terminal connected to the BTS, and/or the authentication, by the UTA terminal, of the BTA entity of the BTS, can be implemented during an initialisation phase prior to the transaction phase.

Initialisation of a BTS

In order to be able to process a transaction, the method for processing a transaction according to at least one embodiment of the invention implements an initialisation phase of at least one BTS. Such a BTS can be a source BTS, an intermediate BTS, or a destination BTS.

According to at least one embodiment, the initialisation phase of a BTS, referred to as local BTS, includes building or updating the BLDB location database.

For example, the LLDB local database is initialised with the identifiers and locators of the terminals connected to the local BTS (UTA_ID, UTA_LOC). Possibly, the local database (LLDB) also stores information relating to banking services, belonging to the group comprising:
- a maximum transfer amount allowed per terminal, possibly per unit of time (for example, per day, per week, per month, etc.);
- a maximum number of transfers allowed per terminal, possibly per unit of time (for example, per day, per week, per month, etc.);
- etc.

The BIDB interconnection database can also be initialised. At start-up, this base can be empty or populated by other means.

The initialisation phase of the local BTS can also implement the configuration/activation of at least one BTA execution entity and/or of at least one BIE interconnection entity of the local BTS with at least one item of location information of the BLDB location database. For example, each of the BTA and BIE entities is configured with a list of addresses to contact the BLDB base. Specific addresses, typically IP addresses or DNS names, can also be used to contact directly the LLDB local database or the BLDB interconnection database.

At the end of this initialisation phase, a local BTS is ready to process local transaction requests (i.e. between a source terminal and a destination terminal connected to the same local BTS), but also to connect to other BTSs. Also, the local BTS can announce to the remote BTSs that it is ready to connect to them.

Discovery of the BTSs

According to at least one embodiment of the invention, the method for processing a transaction comprises a discovery phase of at least one remote BTS, comprising sending by a local BTS, in at least one communication network to which the local BTS is connected, a discovery message indicating the ability of the local BTS to process transactions.

For example, the discovery message carries at least one identifier of the local BTS and one item of location information of at least one interconnection entity enabling the local BTS to connect to the remote BTS(s). Possibly, the discovery message carries at least one additional item of information belonging to the group comprising:
- one item of information indicating whether the local BTS is a source, destination or intermediate BTS;
- one item information indicating the region where the local BTS operates;
- an aggregate, or a list, of identifiers of terminals connected to the local BTS;
- tariff conditions for transfers between BTSs;
- etc.

In particular, as illustrated in FIG. 28, a BTS can use the resources of one or more autonomous system(s) to connect to the Internet. For example, a BTS can activate a routing protocol between BTSs (for example the BGP protocol) or use static routes to connect to the network(s) of the operator(s) in charge of operating the AS(s): the connection of a BTS to several ASs thus improves the availability and even the efficiency of the transaction service proposed by the BTS.

When a BTS uses the resources of the BGP protocol to announce its ability to connect to other BTSs, the discovery message can include a new BGP attribute to announce such an ability: the attribute BTS_CAPABLE. Such an attribute can be defined as an "Extended Community" attribute with the following information:
- "BSID": the identifier of the BTS issuing the attribute BTS_CAPABLE;
- "BIE Locator(s)": a list of addresses of BIE interconnection entities;

and optionally:
- "BTS Role": information indicating if the BTS issuing the attribute BTS_CAPABLE is an intermediate (or forwarding) or sheet (i.e. source or destination) BTS;
- "Country Code(s)": the country or countries where this BTS operates;
- "UTA Prefix Aggregate": an aggregate, or a list, of identifiers of UTA terminals attached to the BTS issuing the attribute BTS_CAPABLE. For example, this field can contain "+212*" for any destination in Morocco, "+2126*" for all mobile numbers starting with "6", "*@orange.fr" for all customers with an "orange.fr" e-mail address, etc.;

"Transfer Rate": the tariff conditions for inter-BTS transfers;

etc.

The BGP message comprising the attribute BTS_CAPABLE is propagated by the routers of the AS(s) to which the local BTS is connected. Such a message is then propagated by BGP in the ASs that may be involved in the traffic routing characteristic of transactions, and that constitutes all or part of the Internet network. The activation of BGP by a BTS is not mandatory if the ASs expose interfaces dedicated to BTSs to inject information into BGP via said AS.

Figure 6:
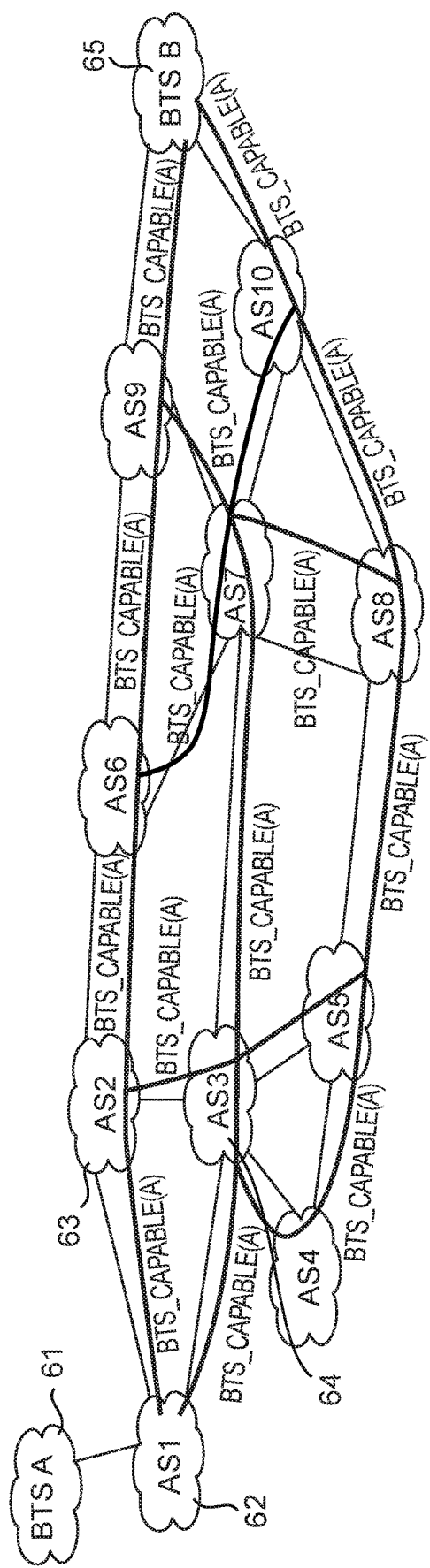
FIG. 6 shows an embodiment of a BTS discovery phase.

As an example, FIG. 6 illustrates a local BTS, the BTS A 61, which identifier "BTID=A" is announced using the attribute BTS_CAPABLE via its access operator operating AS1 62. This information is transmitted to AS1 neighbours, the autonomous systems AS2 63 and AS3 64, depending on the BGP connections in place. From one to the next, the information that the BTS A 61 is ready to connect to other BTSs is thus propagated to the remote BTSs, such as the BTS B 65.

Of course, techniques other than the use of a new BGP attribute to announce the ability of a BTS to connect to another BTS can be implemented, such as the use of DNS SRV ("Domain Name System SeRVice (record)") for example.

Interconnection of BTSs

According to at least one embodiment of the invention, the method for processing a transaction comprises an interconnection phase of a local BTS with at least one remote BTS comprising:

obtaining, by the remote BTS, location information of at least one BIE interconnection entity enabling the local BTS to connect to the remote BTS. For example, such location information can be carried by the discovery message;

sending, by the remote BTS, an interconnection request message to the BE interconnection entity located by the location information.

According to a specific embodiment, each BTS has a database that lists the interconnection agreements established or being established with other BTSs. In other words, a local BTS cannot communicate with just any remote BTS. An interconnection agreement must exist, or be in the process of being established, for two BTSs to be able to communicate. Such a database is for example managed by a BIE interconnection entity responsible for negotiating the interconnection agreements. This database can also be managed by another entity of the BTS.

A remote BTS can also filter the discovery message(s) received (and including for example the attribute BTS_CAPABLE) to retain only certain BTSs in order to establish interconnection agreements.

Thus, the interconnection phase possibly comprises:

checking, by the local BTS, an interconnection agreement between the local BTS and the remote BTS, transmitting, by the local BTS, a message for accepting or not the interconnection request, updating the interconnection database (BIDB) associated with the local BTS and/or the remote BTS.

For example, in reference to FIG. 6, the BTS B 65 has the necessary information to send an interconnection request message to the BTS A 61. In particular, the BTS B 65 has at least one IP address assigned to the BIE interconnection entity of the BTS A 61 to be contacted to initialise an interconnection request; this information is contained in the attribute BTS_CAPABLE.

For example, to send an interconnection request to the BTS A 61, the BTS B 65 generates a message BTS_INTERCONNECT (BSID, NONCE, [CC, UTA Prefix Aggregate, Transfer Rate, . . . ]) that it sends to the IP address of the BIE interconnection entity of the BTS A 61, as announced in the attribute BTS_CAPABLE. The arguments of the message BTS_INTERCONNECT( ) comprise, for example:

"BSID": the identifier of the BTS issuing the message BTS_INTERCONNECT;

"NONCE": a key generated randomly by the BTS issuing the message BTS_INTERCONNECT. This key can be included in the response to this message BTS_INTERCONNECT;

"CC": the country or countries served by the BTS issuing the message BTS_INTERCONNECT. This information can be used by the BTS receiving the message BTS_INTERCONNECT to process the interconnection request;

"UTA Prefix Aggregate": an aggregate, or a list, of identifiers of UTA terminals attached to the BTS issuing the message BTS_INTERCONNECT;

"Transfer Rate": the tariff conditions for inter-BTS transfers;

"Type": a type associated with the interconnection request;

"0" or "Bidirectional": the transaction requests can be issued by the BTS issuing the message BTS_INTERCONNECT and the BTS receiving the message BTS_INTERCONNECT;

"1" or "Send-only": only the BTS issuing the message BTS_INTERCONNECT can issue transaction requests;

"2" or "Receive-only": only the BTS receiving the message BTS_INTERCONNECT can issue transaction requests;

other values can also be defined.

In reference to FIG. 6, upon receipt of the interconnection request message BTS_INTERCONNECT by a BIE interconnection entity of the BTS A 61, it performs checks, such as checking that BTS B 65 is not blacklisted.

Figure 7:
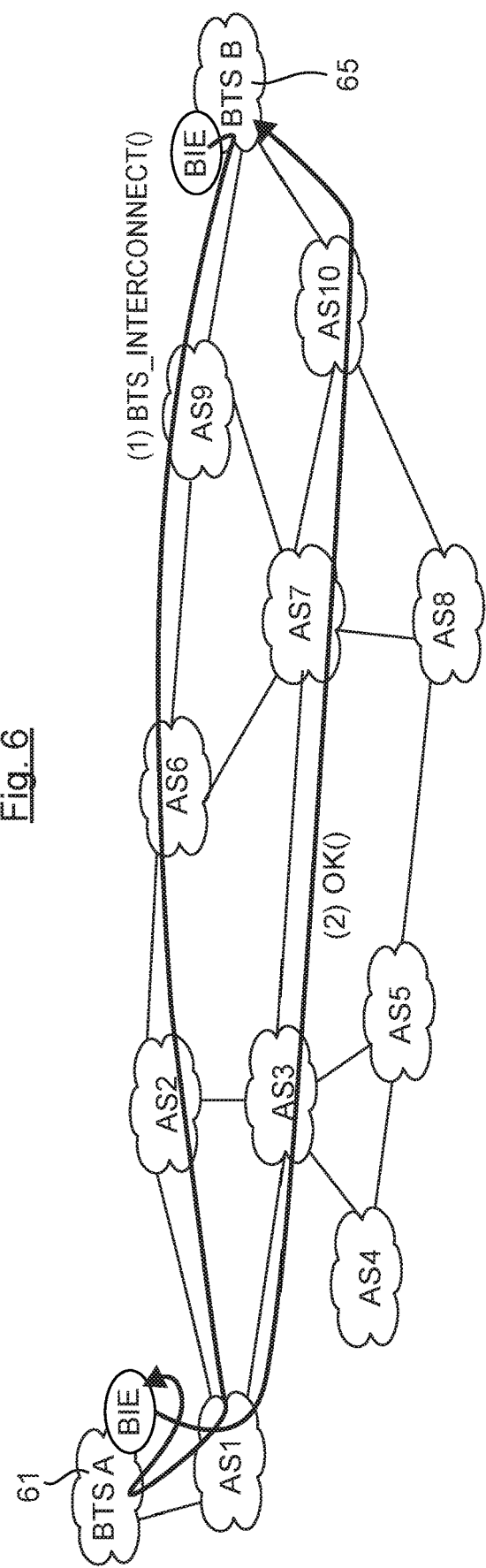
FIG. 7 shows an embodiment of an interconnection phase between BTSs.

As illustrated in FIG. 7, to accept an interconnection request, the BTS A 61 can respond with an acceptance message OK(BSID, NONCE, [CC, UTA Prefix Aggregate. Transfer Rate, Redirect_BIE, . . . ]). The parameters of the acceptance message OK comprise, for example:

"BSID": the identifier of the BTS issuing the message OK;

"NONCE": the key generated randomly by the BTS that issued the message BTS_INTERCONNECT, copied from the associated request BTS_INTERCONNECT;

"CC": the country or countries served by the BTS issuing the message OK;

"UTA Prefix Aggregate": an aggregate, or a list, of identifiers of UTA terminals attached to the BTS issuing the message OK;

"Transfer Rate": the tariff conditions for inter-BTS transfers;

"Redirect.BIE": one or more IP addresses of BIE interconnection entity(ies) to be used for future exchanges.

In particular, the "Redirect_BIE" information can be used in at least one embodiment of the invention in which the BIE interconnection entity(ies) responsible for negotiating the interconnection agreements are different from the BE interconnection entities involved in the processing of the transaction requests.

To refuse an interconnection request, the BTS A 61 can respond with a non-acceptance message NOK(BSID, NONCE, REASON_CODE, . . . ). The reasons for refusing an interconnection request are typically explained in the "REASON_CODE" parameter:

"0" or "Administratively Prohibited": the interconnection request was refused for administrative reasons;

"1" or "Too High Transfer Rates": the interconnection request was refused because the transfer commissions are too high. A counterproposal can be included in the response. The BTS that issued the message BTS_INTERCONNECT can possibly reissue an interconnection request with another tariff proposal;

"2" or "Country Covered": the country identified by the CC parameter of the message BTS_INTERCONNECT is already served by the BTS issuing the message NOK. This error code can for example be used if a BTS decides on a maximum number of BTSs that can serve the same country;

"3" or "Overlapping UTA Aggregate": indicates that the list of identifiers of UTA terminals transmitted comprises UTA terminals served by another BTS. This error code can for example be used if a BTS decides on a maximum number of BTSs that can serve the same UTA terminal.

In case an interconnection request is accepted, the BTS A 61 and BTS B 65 can then update their respective BIDB interconnection databases (or a pooled BIDB base) to include the BTS identifiers and the location information of the BIE interconnection entities to be used to issue transaction requests to a terminal identified in the aggregate (or the list) of "UTA Prefix Aggregate" identifiers.

For example, the BIE interconnection entity of the BTS B 65 locally maintains a correspondence table between the BTID identifier of the BTS A 61 ("Remote BTID") and the location information of the BIE interconnection entity of the BTS A 61 ("Remote BIE locators"). Likewise, the BIE interconnection entity of the BTS A 61 locally maintains a correspondence table between the BTID identifier of the BTS B 65 ("Remote BTID") and the location information of the BIE interconnection entity of the BTS B 65 ("Remote BIE locators").

These correspondences can be used to ensure the routing of transaction requests from a local BTS to a remote BTS. Thus, based on the BTID identifier of a remote BTS, a BIE interconnection entity can select the locator to be used to transmit the transaction request to that remote BTS. An example of association is {UTA Identifier=+212*, Remote BTID=BTID ##145, Remote BIE Locators=[1.2.3.4, 2001: db8::1], . . . }.

A BIE interconnection entity can activate policies for selecting a remote BIE interconnection entity ("Remote BIE Locator") based on considerations such as load balancing, resilience, etc.

It can also be noted that, according to a particular embodiment, in the case of an interconnection with an intermediate BTS, a local BTS can indicate to the intermediate BTS the list of BTS identifiers and/or countries and/or geographical regions, . . . , not to involve in a transaction routing procedure concerning this local BTS. These preferences can be stored by the intermediate BTS in its BLDB location database as a blacklist example.

Exchange of Location Data

According to at least one embodiment of the invention, the method for processing a transaction comprises a location information exchange phase, comprising:

transmitting, by a local BTS, to at least one remote BTS, a location message carrying at least one identifier of a terminal connected to the local BTS, associated with at least one item of location information of this terminal. This information is notably extracted from the BLDB location database, in particular from the LLDB local database associated with the local BTS;

updating the BIDB interconnection database associated with the remote BTS upon receipt, by the remote BTS, of the location message.

Such a location message can be issued in response to a request issued by a remote BTS, said request carrying at least one item of information belonging to the group comprising:

an identifier of the remote BTS, a key generated by the remote BTS.

In a variant, such a location message can be issued periodically or following a change (modification of the list of identifiers of the UTA terminals, modification of the BLDB, modification of the tariff clauses, etc.).

For example, such a location message carries at least one item of information belonging to the group comprising:

an identifier of the local BTS, a key generated by the local BTS or the remote BTS, a list of identifiers of the terminals connected to the local BTS.

Figure 8:
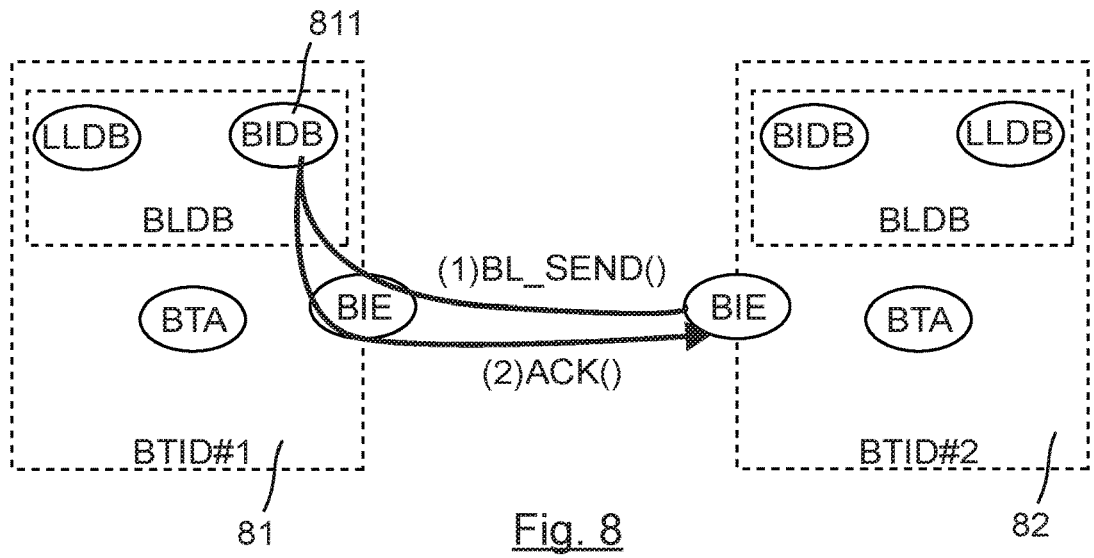
FIGS. 8 and 9 propose two embodiments of a location data exchange phase between BTSs.
Figure 9:
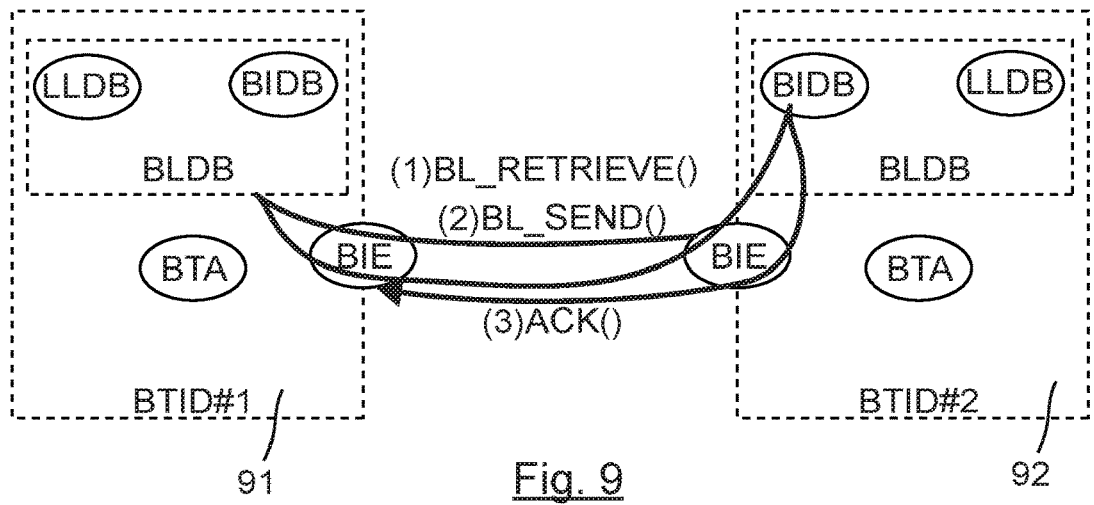

In particular, as illustrated in FIGS. 8 and 9, once the interconnection has been successfully negotiated between two BTSs, the two BTSs can proceed to the exchange of the "identifiers cards" of the UTA terminals they maintain. In other words, a local BTS can transmit to a remote BTS, to which it is connected, the list of UTA terminals connected to the local BTS.

Moreover, since the BLDB location database associated with a local BTS (or common to a plurality of BTSs) carries location information relating to at least one terminal connected to the local BTS or to at least one remote BTS, it is possible to exchange this location information, associated with the identifier of the terminals concerned, between the interconnected BTSs.

Other information can also be exchanged, such as billing rules, load thresholds (that can be expressed as a maximum number of requests per second, for example), country-specific regulatory constraints, etc.

The exchange of these identifier cards can be done on the initiative of one BTS or of both.

In particular, in the case where a BTS implements a "brokering" service to select an intermediate BTS, the exchange of cards can be either bilateral (the forwarding or "broker" BTS exchanges the contents of its cards with each of the BTSs with which an interconnection agreement has been concluded) or multilateral, for example in the context of the service provided by a banking alliance responsible for the operation of the "broker" BTS: in the latter case, the content of the cards maintained by the forwarding or "broker" BTS can be distributed to all the partner BTSs, members of the banking alliance, and with which interconnection agreements have been established (de facto).

The exchange of terminal identifiers, and associated location information, can be solicited or not. It can also be regular or determined by an event such as the modification of the list of UTA identifiers (if a terminal connects to or disconnects from the local BTS), of tariff clauses, etc.

FIG. 8 more precisely illustrates the sending of the terminals identifiers, and associated location information, according to the unsolicited mode. For example, the local BTS 82 sends to the remote BTS 81 a location message BL_SEND (BSID, NONCE, UTA Prefix List, . . . ). The remote BTS 81 can respond with an acceptance message ACK (BSID, NONCE, RESULT_CODE, . . . ).

The arguments of the message BL_SEND( ) are, for example:
"BSID": the identifier of the local BTS 82 issuing the message BL_SEND( );
"NONCE": a key generated randomly by the local BTS 82 issuing the message BL_SEND( );
"UTA Prefix List": a list of identifiers of UTA terminals served by the local BTS 82 issuing the message BL_SEND( ).

Once the message BL_SEND( ) is received by the remote BTS 81, the BTS 81 retrieves the specified location information, updates its BIDB interconnection database 811 with the location information, and then responds with a message ACK( ) to inform the BTS 82 that issued the message BL_SEND( ) of the processing status of the message BL_SEND( ). The arguments of the message ACK( ) are, for example:
"BSID": the identifier of the BTS 81 issuing the message ACK( );
"NONCE": the key generated randomly by the BTS 82 that issued the message BL_SEND( ), copied from the request BL_SEND ( );
"RESULT_CODE": the processing status of the request. The following values can be filled in, as an example:
"0": Success.
"1": Failure. In case the request fails, a subtype can be used to specify the cause of the request failure. For example, the following values can be indicated:
"0" or "Malformed": indicates that the location message BL_SEND( ) is not formed properly,
"1" or "Missing Mandatory Information": indicates that the location message BL_SEND( ) does not populate a required field,
"2" or "Invalid BSID": indicates that the BSID of the location message BL_SEND( ) is incorrect,
"3" or "Denied": indicates that the location message BL_SEND( ) cannot be processed because the BTS 82 that issued the location message BL_SEND( ) is not authorised to issue this message.

As for FIG. 9, it illustrates the sending of the terminal identifiers, and associated location information, according to the solicited mode. For example, the local BTS 92, that wants to receive (a copy of) the identifiers card of the UTA terminals connected to the remote BTS 91, explicitly expresses this request to the BTS in question, by sending a message BL_RETRIEVE(BSID, NONCE, [Filters, . . . ]). Such a message BL_RETRIEVE( ) can be sent spontaneously (in case of a modification of the list of UTA terminals for example) or at regular intervals.

The arguments of the message BL_RETRIEVE( ) are, for example:
"BSID": the identifier of the local BTS 92 issuing the message BL_RETRIEVE( ),
"NONCE": a key generated randomly by the local BTS 92 issuing the message BL_RETRIEVE( ).

and optionally:
"Filters": one or more filters (e.g. the UTA terminals whose identifier begins with +33) allowing the selection of certain UTA terminal identifiers that the local BTS 92 wants to retrieve.

Indeed, the remote BTS 91 does not necessarily have to provide the identifiers of all the UTA terminals attached to the remote BTS 91, but only those that correspond to the filters.

In response, the remote BTS 91 returns the message BL_SEND( ) containing the identifiers of the selected terminals. In this case, the "NONCE" field in the message BL_SEND( ) is identical to the one in the message BL_RETRIEVE( ). The processing of the message BL_SEND( ) by the local BTS 92 is identical to that of the unsolicited mode.

The location information received in a location message BL_SEND( ) can be saved in the BLDB location database (more specifically, in the BIDB interconnection database). Possibly, this location information can be augmented with the location information (for example the IP address) of the BIE interconnection entity of the remote BTS to be contacted as well as that of the BIE interconnection entity of the local BTS.

An intermediate BTS can possibly send a list of default UTA terminal identifiers, denoted for example (*), to indicate that this BTS is able to process the transactions to any UTA terminal. As already mentioned, such an intermediate BTS can be solicited to route a transaction between two BTSs when a BTS does not have specific paths to reach the destination BTS, i.e. is not connected directly to the destination BTS.

According to a particular embodiment of the invention, a BTS can inform of a change in transfer costs, notably bank commissions, one or more BTSs to which it is connected ("partner BTSs"). For this purpose, a period of validity of the tariff conditions can also be communicated. This information can be carried by the message BL_SEND( ).

It can also be noted that, according to at least one embodiment of the invention, two interconnected BTSs can exchange the balance sheets of the transactions, either periodically or at the request of one BTS. This is done, for example, using the messages BALANCE_SEND( ), BALANCE_RETRIEVE( ) or ACK( ):
the message BALANCE_SEND(BSID, Transfer_In, Transfer_Out, [Start_Date, End_Date, Detailed_Logs, . . . ]) indicates, for example, the amount of the transactions received from the BTS receiving this message ("Transfer_In") and that of the transactions issued by the BTS issuing this message ("Transfer_Out"), as maintained by the BTS issuing the message. The message can specify, where applicable, the calculation period of the balance sheet with, for example, a start date and an end date ("Start_Date", "End_Date").
the message ACK(STATUS_CODE, [Transfer_In, Transfer_Out, Start_Date, End_Date, Detailed_Logs, . . . ]) is used by a BTS to confirm to a BTS to which it is connected the receipt of a message BALANCE_SEND( ).

For example, the STATUS_CODE parameter is set to "0" to indicate that the BTS issuing the message ACK confirms the correctness of the balance sheet with its own transaction monitoring files, or "1" to indicate an error in the balance sheet.

In case an error is detected, a detailed inventory ("Detailed_Logs") can be transmitted to the remote BTS (that issued the message BALANCE_SEND( )) in order to facilitate the verification operations. In this case, the remote BTS can retransmit another message BALANCE_SEND( ) after correction, trigger an escalation procedure, etc.

the message BALANCE_RETRIEVE(BSID, [Start_Date, End_Date, . . . ]) can be used to ask a remote BTS to transmit the balance sheet of the operations for a specified period. The remote BTS can respond to the message BALANCE_RETRIEVE(BSID, [Start_Date, End_Date, . . . ]) with the message BALANCE_SEND( ).

Processing of the Transactions

A description is given below, in relation to FIGS. 10 to 13, of embodiments of the transaction phase between a source terminal and a destination terminal according to at least one embodiment of the invention.

As previously mentioned, the source terminal and the destination terminal can be connected to the same BTS, or to different BTSs. In the latter case, intermediate BTSs can be used to route the transaction request from the source terminal to the destination terminal.

Figure 11:
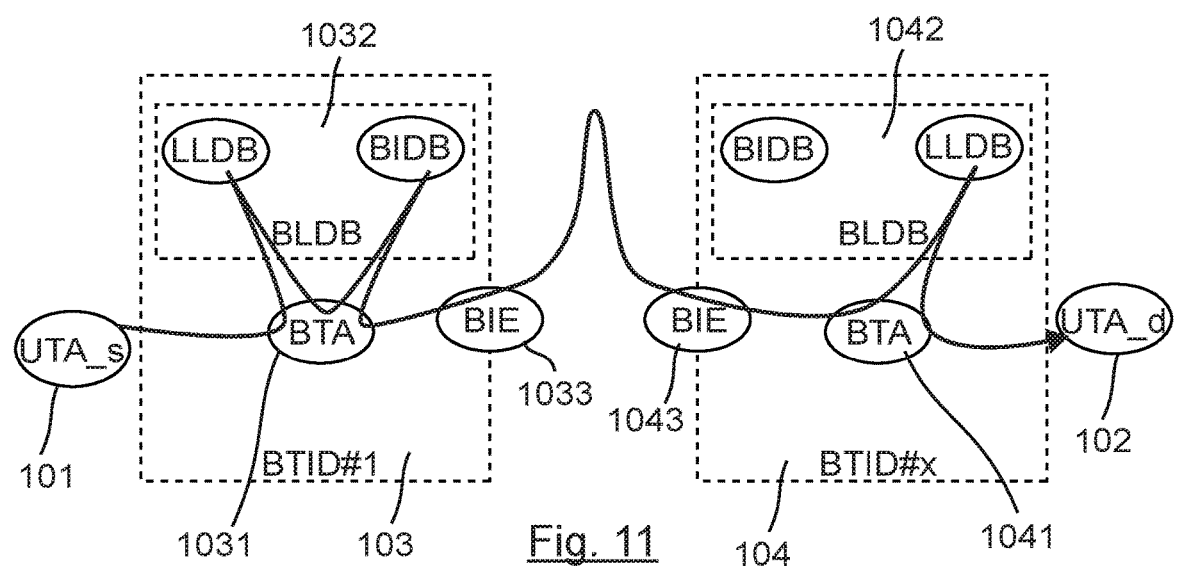
FIGS. 10 to 13 show embodiments of a transaction phase, whether the source terminal is connected to the same BTS as the destination terminal or not.
Figure 10:
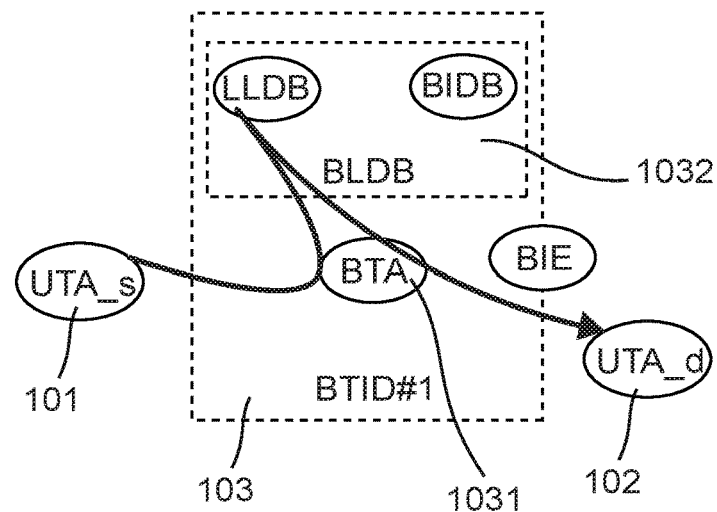
Figure 12:
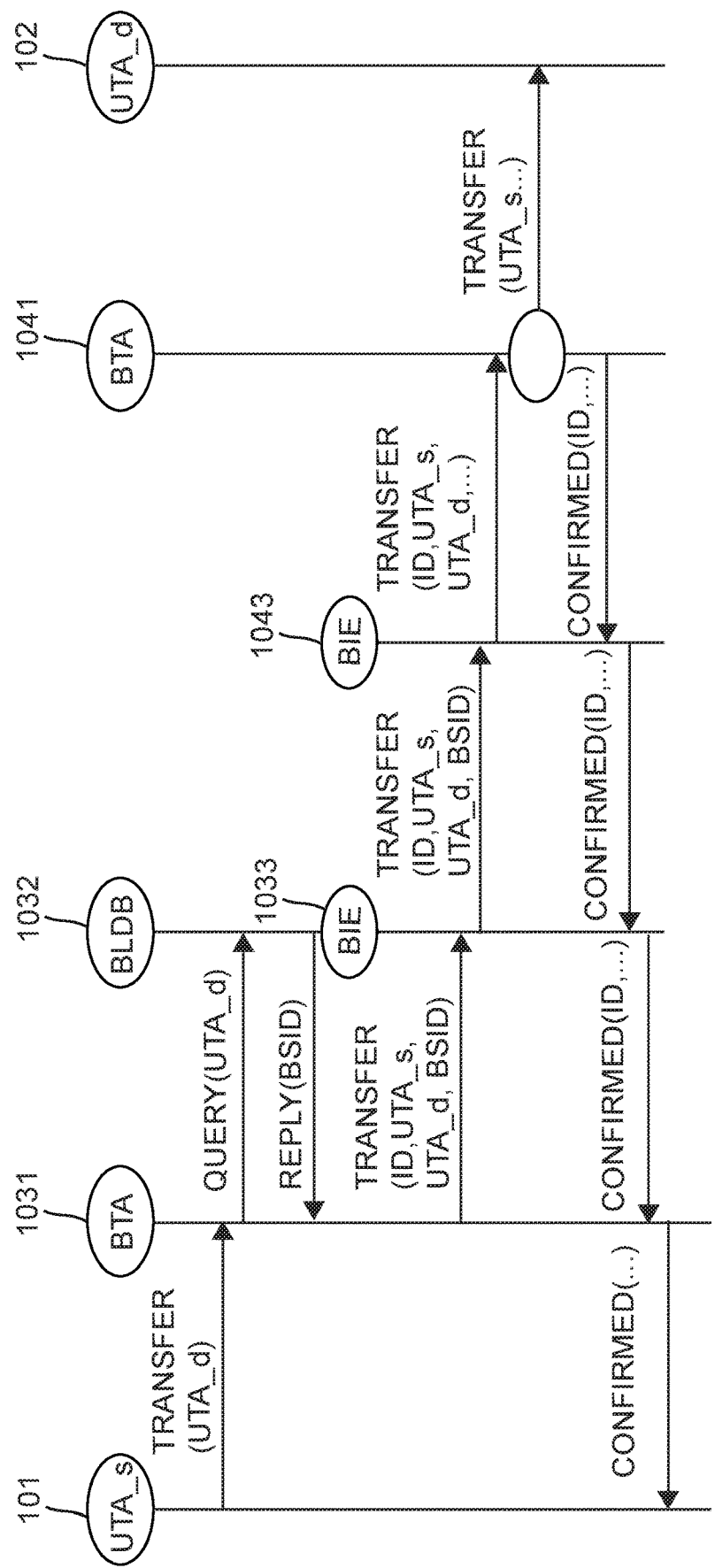
Figure 13:
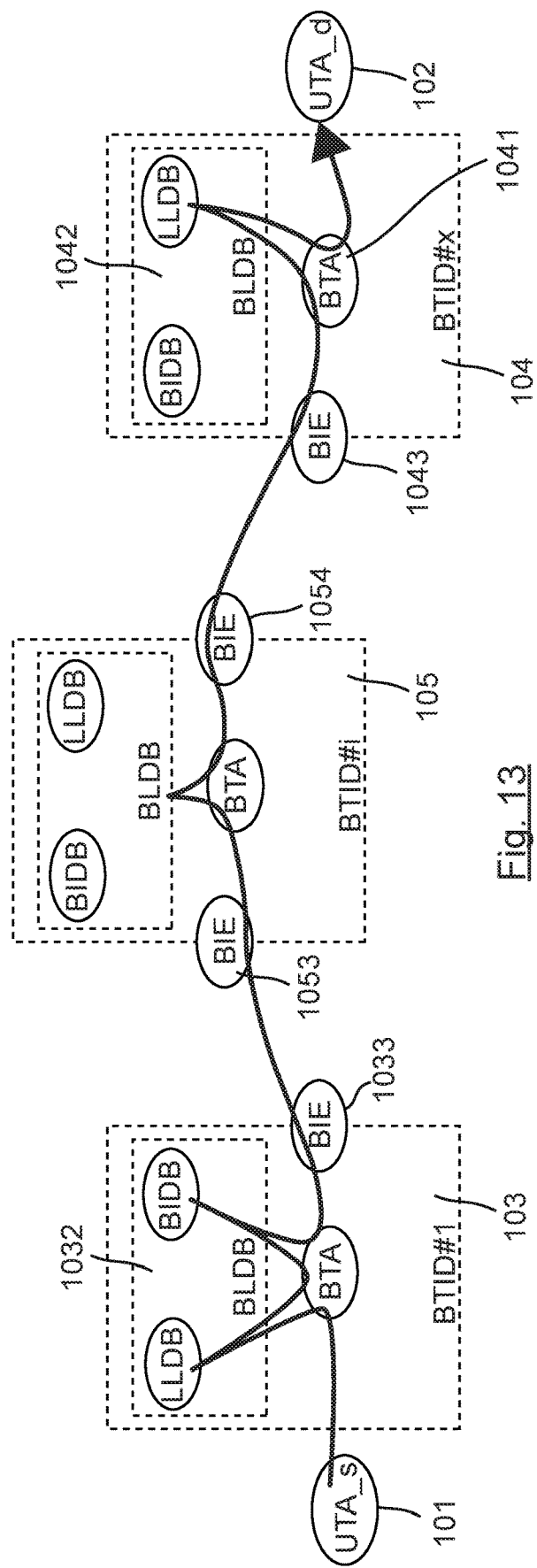

FIG. 10 illustrates the example of a source terminal 101 and of a destination terminal 102 connected to the same BTS 103. FIG. 11 illustrates the example of a source terminal 101 connected to a source BTS 103 and of a destination terminal 102 connected to a destination BTS 104, the source and destination BTSs being connected directly. FIG. 12 illustrates the messages exchanged between the different entities for an inter-BTS transaction corresponding to the example in FIG. 11. FIG. 13 illustrates the example of a source terminal 101 connected to a source BTS 103 and of a destination terminal 102 connected to a destination BTS 104, the source and destination BTSs being connected via an intermediate BTS 105.

The source terminal 101, identified by the identifier UTA_s, issues a transaction request TRANSFER( ), carrying at least the identifier UTA_d of the destination terminal 102.

For example, the source terminal issues the request TRANSFER(UTA Identifier, Amount, [target_execution_date, . . . ]). The arguments of the request comprise, for example:

"UTA Identifier": the identifier UTA_d of the destination terminal 102,

"Amount": the amount of the transaction, and optionally:

"Currency": the currency or unit used for the transaction; indeed, the amount of a transaction can be, for example, expressed in currencies, or in number of units credited to a communication service account (telephony, traffic volume, etc.), "Target_execution_date": an execution date for a deferred transaction, "Tracking": one item of information indicates if the issuer/source terminal wants to be informed of the transaction status (recipient notified, amount of money transferred, etc.).

The BIA execution entity 1031 of the BTS source 103 receives the transaction request, and checks the BLDB location database 1032 (using for example a request "QUERY(UTA_d)"), to obtain destination terminal location information (LOC_UTA_d).

For example, if the source terminal 101 and the destination terminal 102 are connected to the same BTS, as illustrated in FIG. 10, the BTA execution entity 1031 checks more specifically the LLDB local database. If the source terminal 101 and the destination terminal 102 are not connected to the same BTS, as illustrated in FIGS. 11 to 13, the BTA execution entity 1031 checks more specifically the BIDB interconnection database, either in "generic" mode or in "specific" mode.

The identifier UTA_d of the destination terminal 102 can be used as a key in the BLDB location database 1032 to obtain location information LOC_UTA_d of the destination device.

If no information is found in the BLDB location database 1032 for the identifier UTA_d of the destination terminal 102, the BTA execution entity 1031 sends a failure message to the source terminal 101, for example the response FAILED(UTA Identifier, Amount, CAUSE, . . . ), to inform it of the failure of the operation. The CAUSE field can be used to provide the reason for the failure of the transaction request, for example:

"0" or "Administratively Prohibited": indicates that the request was refused for administrative reasons;

"1" or "Maximum Exceeded": indicates that a maximum transfer amount has been reached;

"2" or "Not Found": indicates that the destination terminal is not known;

etc.

If location information LOC_UTA_d of the destination terminal is found in the BLDB location database 1032 for the identifier UTA_d of the destination terminal 102, the BTA execution entity 1031 uses the location information LOC_UTA_d to determine the BTS connected to the destination terminal. For example, the BTA execution entity 1031 retrieves the identifier of the BTS to be contacted, as well as the address of the BIE interconnection entity to be contacted if the source BTS is not the destination BTS, for example in a message "REPLY(BSID)".

According to the example illustrated in FIG. 10, since the source 101 and destination 102 terminals are connected to the same BTS, the BTS transmits (35) the transaction request to the destination terminal. The BTA execution entity 1031 therefore takes care of relaying the transaction request to the destination terminal using the location information LOC_UTA_d obtained from the database LLDB. The BTA execution entity 1031 can also take care of relaying the confirmation of the completeness (or of its possible failure) of the transaction to the destination terminal. For example, the transaction confirmation message can be a text message, a voice message, a QR code available in a customer area, etc.

According to the examples illustrated in FIGS. 11 to 13, since the source 101 and destination 102 terminals are not connected to the same BTS, the transaction request is relayed to the interconnection entity 1033 of the local BTS 103, which then relays it to the BIE interconnection entity 1043 of the destination BTS 104 (FIGS. 11 and 12) or to the BIE interconnection entity 1053 of an intermediate BTS 105 (FIG. 13).

It is noted that the message TRANSFER( ) thus relayed can be accompanied by other information, for example parameters of type:

"TRANSACTION_IDENTIFIER": used to identify a request, particularly in case of "forking", when several paths are possible, "SECURITY_TOKEN": security identifier, "Target BTID": identifier of the remote BTS to which the message TRANSFER( ) is to be routed, etc., which can then be added to the message TRANSFER( ).

According to the example illustrated in FIGS. 11 and 12, the transaction request is relayed from the BTA execution entity 1031 to the BE interconnection entity 1033 of the local BTS 103, in the form of the message TRANSFER comprising for example the ID (identifier of the destination BTS), UTA_s (identifier of the source terminal), UTA_d (identifier of the destination terminal) and BSID (identifier of the source BTS 103) parameters. After checking the correspondence table of the BIE interconnection entity 1033 of the local BTS 103, the transaction request is relayed from the BIE interconnection entity 1033 to the BIE interconnection entity 1043 of the destination BTS 104 in the form of the message TRANSFER comprising for example the ID (identifier of the destination BTS), UTA_s (identifier of the source terminal), UTA_d (identifier of the destination terminal) and BSID (identifier of the source BTS 103) parameters.

Once the message TRANSFER is received by the BIE interconnection entity 1043 of the destination BTS 104, the BIE interconnection entity 1043 relays the message TRANSFER to the BTA execution entity 1041 of the destination BTS 104, for example in the form of the message TRANSFER comprising for example the ID (identifier of the destination BTS), UTA_s (identifier of the source terminal), UTA_d (identifier of the destination terminal), etc.) parameters. The BTA execution entity 1041 of the destination BTS 104 performs local checks at the destination BTS 104, and particularly checks the BLDB location database 1042 of the destination BTS 104 to retrieve the location information associated with the destination terminal 102. The BTA execution entity 1041 relays the transaction request to the destination terminal 102 to inform it of the transaction, in the form of the message TRANSFER comprising for example the UTA_s (identifier of the source terminal) parameter, etc.

According to the example illustrated in FIG. 13, once the message TRANSFER is received by the BIE interconnection entity 1053 of the intermediate BTS 105, the BIE interconnection entity 1043 relays the message TRANSFER to the BTA execution entity 1051 of the intermediate BTS 105, that relays it to the BIE interconnection entity 1054 of the intermediate BTS 105, that then relays it to the BIE interconnection entity 1043 of the destination BTS 104. The BIE interconnection entity 1043 relays the message TRANSFER to the BTA execution entity 1041 of the destination BTS 104 that performs local checks at the destination BTS 104, then transmits the message to the destination terminal 102 to inform it of the transaction.

A confirmation message CONFIRMED( ) can be sent to the destination terminal and to the various entities (execution or interconnection) that transmitted the message TRANSFER. The confirmation can be relayed up to the source terminal 101.

It is noted that another order can be used to relay the messages between the various entities.

If several paths are possible between the source BTS 103 and the destination BTS 104, the BTA execution entity of the source BTS (or of an intermediate BTS) can choose the most advantageous remote BTS (in terms of commission charges) in order to optimise the transfer costs.

The transaction request TRANSFER( ) can therefore be sent to several intermediate BTSs in order to select at least one intermediate BTS while respecting at least one predetermined selection criterion. Such intermediate BTSs can notably be located in different countries.

For example, a current BTS implements at least one iteration of the following steps to identify a next BTS, the first current BTS being the source BTS and the last next BTS being the destination BTS:

obtaining location information of at least one BIE interconnection entity enabling a current BTS to connect to a next BTS.

transmitting, to at least one next BTS identified by the BIE interconnection entity, the transaction request.

A funds transfer request can also be broken down into several TRANSFER( ) requests sent to different intermediate BTSs, but where the total amount of all the requests is equal to the sum to be transferred to the destination terminal. In this case, the TRANSACTION_IDENTIFIER field can be used to correlate the different transaction requests received by the BTA execution entity 1041 of the destination BIS 104.

In a particular embodiment, a UTA terminal includes a memory storing at least one identifier of at least one BTS. Such a terminal can therefore be configured with a list of BTSs. Thus, the same transaction request can be transmitted to several BTSs attached to the UTA terminal. The UTA terminal can confirm the transaction via one of these BTSs (source BTS) according to one or more selection criteria (for example, the BTS offering the minimum transfer commission). The negotiation procedure between the UTA terminal and the BTSs according to this embodiment can use the same primitives as those invoked between two BTSs.

In the examples in FIGS. 10 to 13, a BTS with a single BTA execution entity was considered. Of course, according to another embodiment, several BTA entities can be implemented.

In this case, obtaining destination terminal location information implements at least one iteration of obtaining, by a current execution entity of the BTS (current BTA), location information of at least one next execution entity of the BTS (next BTA), from the BLDB location database and at least one identifier of the destination terminal. The last execution entity delivers the destination terminal location information.

Figure 14:
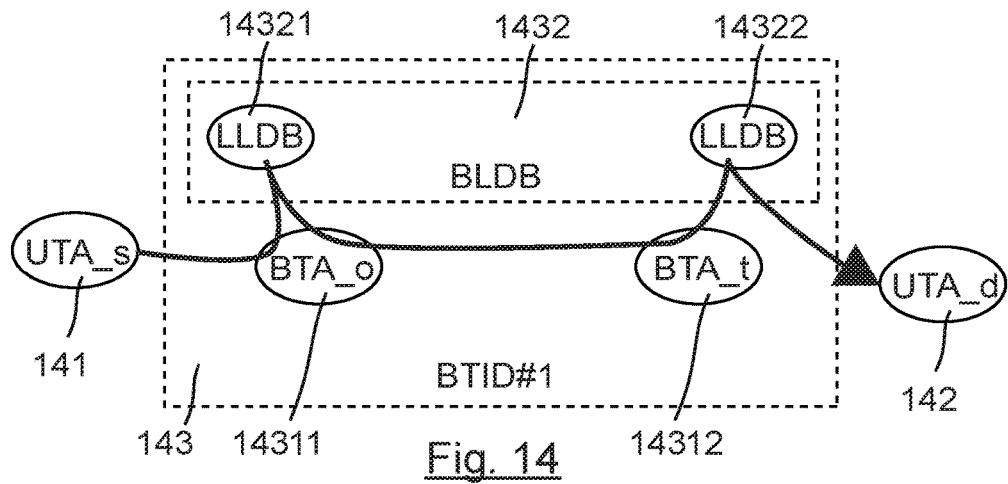
FIG. 14 illustrates the use of several execution entities within a BTS according to a particular embodiment.

For example, as illustrated in FIG. 14, several execution entities BTA 14311, 14312, . . . , can be solicited for processing a transaction. The BLDB location database 1432 comprises for example several LLDB local databases 14321, 14322, . . . , that can be activated within a BTS, each being attached to a BTA execution entity. In this example, the source terminal issues a transaction request to the destination terminal, carrying an identifier of the destination terminal. The request is then received by a first BTA entity 14311 (BTA_o, "Originating BTA") that solicits the location database 1432, and more specifically the local database 14321 attached to the first BTA entity 14311 to retrieve the destination terminal location information. In this case, the local database 14321 returns the address of a second BTA entity 14312 (BTA_t "Terminating BTA") as location information of at least one next execution entity. The first BTA entity 14311 (BTA_o) can thus route the transaction request to the second BTA entity 14312 (BTA_t), and so on.

Figure 15:
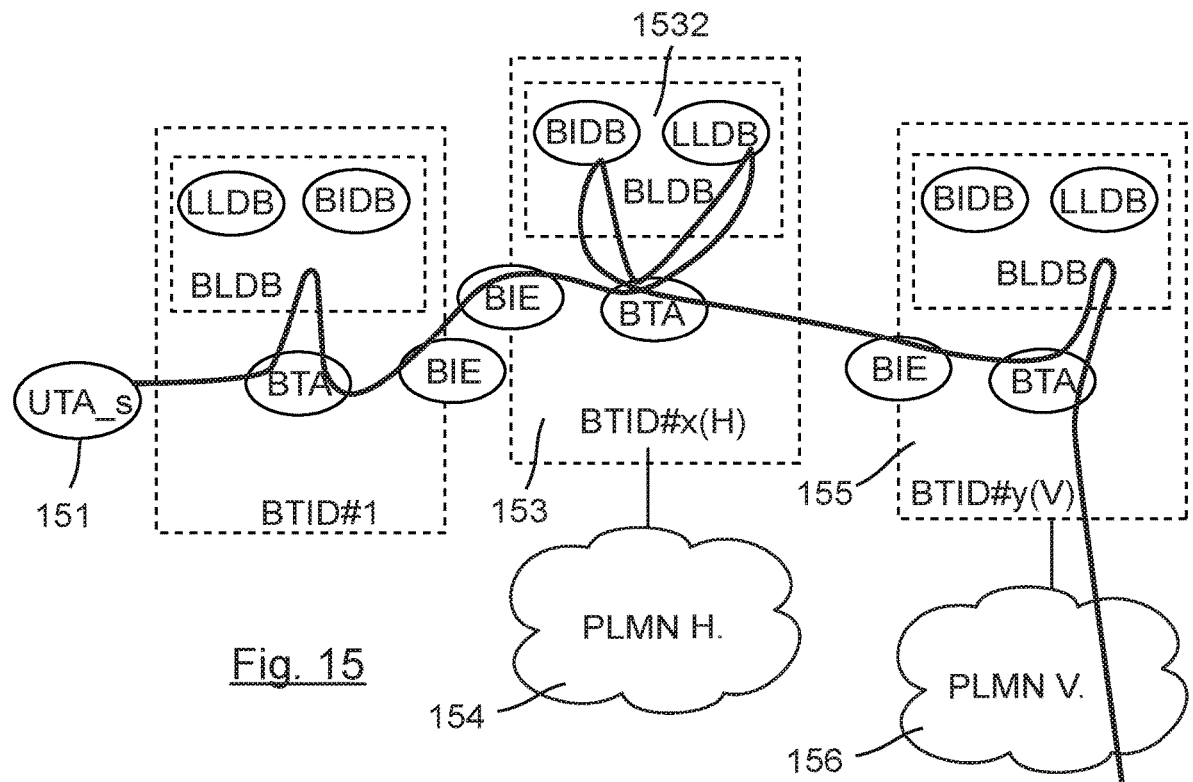
FIG. 15 shows an embodiment of the invention in case of roaming of the destination terminal.

Finally, a description is given, in relation to FIG. 15, of an embodiment of the invention in case of roaming of the recipient of the transaction. In this example, the destination terminal 152, identified by UTA_d, is not connected to the BTS H 153 attached to its home mobile network (PLMN HOME 154), but to the BTS V 155 attached to a visited network (PLMN VISITED 156). When the transaction request TRANSFER( ) is received by a BTA execution entity of the BTS H 153, it solicits the BLDB location database 1532 to retrieve the location information associated with the destination terminal 152. The BLBD database 1532 indicates that the user of the destination terminal 152 (identified by an MSIDN number, in this example) is roaming and searches for the BTS V 155 associated with the visited network. It should be noted that, in a particular embodiment, this information can be prepared in advance by correlating the location BLDB databases with the roaming data, be prepared at the time of a transaction, be submitted to one of the services provided by a "broker" BTS, etc.

The identifier of at least one BTS serving the visited network is then returned by the BLBD location database 1532. The transaction request can thus be transmitted to the BTS V 155 of the visited network. After local checks (where applicable), the transaction can be notified to the destination terminal 152. The recipient can then have the amount of the transaction, regardless of their location.

Finalisation of the Transaction

The issuer of the transaction can choose to deduct the transaction amount from their telephone balance (e.g. balance for prepaid customers) or to include the amount in the telecommunications services bill (typically, for postpaid customers). The traditional payment methods (e.g. direct debits) can, of course, also be used.

The recipient of the transaction can, as for them, receive the amount of the transaction in an agency or in a bank account. The amount of the transaction can also be convened into a telecommunications services credit, and used to pay for telecommunications bills or other services chosen by the recipient.

Structures

Figure 16:
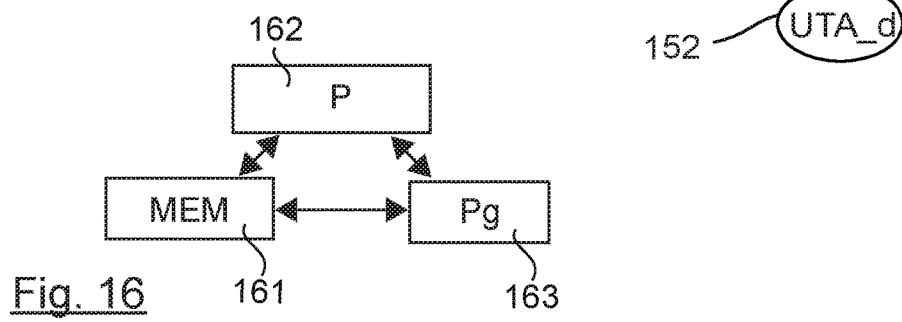
FIG. 16 shows the simplified structure of a BTS according to a particular embodiment.

Finally, a description is given, in relation to FIG. 16, of the simplified structure of a banking services system BTS according to one of the embodiments described above.

Such a BTS comprises a memory 161 comprising a buffer memory, a processing unit 162, equipped for example with a programmable computing machine or a dedicated computing machine, for example a P processor, and controlled by the computer program 163, implementing the method for processing a transaction according to one embodiment of the invention.

At initialisation, the code instructions of the computer program 163 are for example loaded into a RAM memory before being executed by the processor of the processing unit 162.

The processor of the processing unit 162 implements the steps of the method for processing a transaction previously described, according to the instructions of the computer program 163, to route a transaction request from a source terminal to a destination terminal.

According to a particular embodiment, the processor of the processing unit 162 activates at least one instance of a BTA execution entity and/or at least one instance of a BIE interconnection entity and/or at least one instance of a BLDB location database to route a transaction request from a source terminal to a destination terminal.

The invention claimed is:

1. A method of processing a transaction in an IP telecommunications network between a source terminal and a destination terminal, wherein the method comprising:
receiving, by a banking services system, referred to as source banking transfer system (BTS), connected to the source terminal, a transaction request originating from the source terminal, the request carrying at least one identifier of the destination terminal and a transaction amount,
obtaining, by a current execution entity of the source BTS, destination terminal location information, on the basis of at least one BTS location database (BLDB) and the destination terminal identifier, the obtaining destination terminal location information implementing at least one iteration of obtaining, location information of at least one next execution entity of the source BTS, from the BLDB location database and the at least one identifier of the destination terminal, and wherein the last execution entity delivers the destination terminal location information,
determining, by the source BTS, at least one banking services system, referred to as destination BTS, connected to the destination terminal, on the basis of the destination terminal location information,
if the source BTS is not the destination BTS, at least one iteration of the following steps, implemented as long as the transaction request has not reached the destination BTS:
selecting an intermediate banking services system, referred to as intermediate BTS, taking into account at least one selection criterion to choose the most advantageous path to the destination BTS, and
transmitting the transaction request to the intermediate BTS; and
transmitting to the destination terminal, by the destination BTS, the request or one item of information relating to the transaction.

2. The processing method of claim 1, wherein the at least one selection criterion is one of the following:
a minimum transfer cost;
a minimum number of intermediate BTSs; and
a minimum distance between two BTSs.

3. The processing method of claim 1, wherein the method additionally comprises a prior phase for initializing at least one banking services system, referred to as local BTS, comprising:
building or updating the at least one location database (BLDB), the location database (BLDB) comprising:
a local database (LLDB), comprising location information relating to at least one terminal connected to the local BTS, identified by an identifier, and
an interconnection database (BIDB), comprising location information relating to at least one terminal connected to at least one remote BTS; and
the configuration of at least one execution entity of the local BTS with at least one item of location information of the location database (BLDB).

4. The processing method of claim 3, wherein the method additionally comprises a discovery phase of at least one remote BTS, comprising sending by the local BTS, in at least one communication network to which the local BTS is connected, a discovery message indicating the ability of the local BTS to process transactions.

5. The processing method of claim 3, wherein the method additionally comprises an interconnection phase of the local BTS with at least one remote BTS comprising:
obtaining, by the remote BTS, location information of at least one interconnection entity (BIE) enabling the local BTS to interconnect with the remote BTS,
sending, by the remote BTS, an interconnection request message to the interconnection entity located by the location information.

6. The processing method of claim 3, wherein the method additionally comprises a location information exchange phase, comprising:
transmitting, by the local BTS, to at least one remote BTS, a location message carrying at least one identifier of a terminal connected to the local BTS associated with at least one item of location information of this terminal, and updating the interconnection database (BIDB) associated with the remote BTS upon receipt, by the remote BTS, of the location message.

7. The processing method of claim 1, wherein the transaction request also carries at least one item of information selected from the following:
   a currency or a unit for the transaction,
   an execution date for the transaction,
   an indicator indicating if the source terminal wants to be informed of the transaction status,
   an identifier of the transaction,
   a security identifier, and
   an identifier of a remote BTS through which the transaction request transits.

8. A system for processing a transaction in an IP telecommunications network between a source terminal and a destination terminal, comprising at least one programmable computing machine or one dedicated computing machine configured to:
   receive and/or transmit a transaction request, the request carrying at least one identifier of the destination terminal and a transaction amount,
   obtain destination terminal location information, on the basis of at least one location database, denoted BLDB, and the destination terminal identifier, the destination terminal location information being obtained by implementing at least one iteration of obtaining, location information of at least one next execution entity of the source BTS, from the BLDB location database and the at least one identifier of the destination terminal, and wherein the last execution entity delivers the destination terminal location information,
   determine at least one banking services system, referred to as destination BTS, connected to the destination terminal, on the basis of the destination terminal location information, and
   select at least one intermediate banking services system, referred to as intermediate BTS, taking into account at least one selection criterion to choose the most advantageous path to the destination BTS.

9. A terminal used for processing a transaction in an IP telecommunications network, comprising at least one programmable computing machine or one dedicated computing machine configured to:
   issue at least one transaction request, the request carrying at least one identifier of a destination terminal of the transaction and a transaction amount,
   wherein the terminal additionally comprises a memory storing at least one identifier of at least one banking services system, and means for selecting one of the banking services systems, referred to as source BTS, taking into account at least one selection criterion to choose the most advantageous path to a destinations BTS connected to the destination terminal.

10. The terminal of claim 9, comprising at least one programmable computing machine or one dedicated computing machine configured to receive the transaction request or one item of information relating to the transaction.

* * * * *